United States Patent
Seo

(10) Patent No.: US 10,630,992 B2
(45) Date of Patent: Apr. 21, 2020

(54) METHOD, APPLICATION PROCESSOR, AND MOBILE TERMINAL FOR PROCESSING REFERENCE IMAGE

(71) Applicant: Samsung Electronics Co., Ltd., Suwon-si (KR)

(72) Inventor: Youngil Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 445 days.

(21) Appl. No.: 14/991,684

(22) Filed: Jan. 8, 2016

(65) Prior Publication Data

US 2017/0201751 A1 Jul. 13, 2017

(51) Int. Cl.
| | |
|---|---|
| *H04N 19/105* | (2014.01) |
| *H04N 19/139* | (2014.01) |
| *H04N 19/172* | (2014.01) |
| *H04N 19/147* | (2014.01) |
| *H04N 19/117* | (2014.01) |
| *H04N 19/159* | (2014.01) |
| *H04N 19/17* | (2014.01) |

(Continued)

(52) U.S. Cl.
CPC ......... *H04N 19/139* (2014.11); *H04N 19/105* (2014.11); *H04N 19/117* (2014.11); *H04N 19/147* (2014.11); *H04N 19/159* (2014.11); *H04N 19/17* (2014.11); *H04N 19/172* (2014.11); *H04N 19/176* (2014.11); *H04N 19/43* (2014.11)

(58) Field of Classification Search
CPC .. H04N 19/105; H04N 19/147; H04N 19/176; H04N 19/43; H04N 19/139
See application file for complete search history.

(56) References Cited

U.S. PATENT DOCUMENTS 7,834,874 B2 11/2010 Lee
8,130,234 B2 3/2012 Takemoto
(Continued)

FOREIGN PATENT DOCUMENTS

EP 2787737 10/2014
KR 10-2008-0064072 7/2008
(Continued)

OTHER PUBLICATIONS

Sullivan et al., "Overview of the High Efficiency Video Coding (HVEC) Standard," IEEE Transactions on Circuits and Systems for Video Technology, Dec. 2012, pp. 1649-1668, vol. 22, No. 12.
(Continued)

*Primary Examiner* — Dave Czekaj
*Assistant Examiner* — Berteau Joisil
(74) *Attorney, Agent, or Firm* — H.C. Park & Associates, PLC

(57) ABSTRACT

A method of an application processor including a processor, a video coder, a memory, and a graphic processing unit (GPU), the method including modifying, based on a modification parameter, a reference image to generate a modified reference image, the reference image being configured to be stored in the memory, and determining motion information associated with a coding block of a current image, the current image and the reference image being temporally different. The motion information is associated with at least one of the modification parameter and the modified reference image.

14 Claims, 18 Drawing Sheets

(51) Int. Cl.
*H04N 19/176* (2014.01)
*H04N 19/43* (2014.01)

(56) References Cited

U.S. PATENT DOCUMENTS

| | | | |
|---|---|---|---|
| 8,144,162 B2 | 3/2012 | Woo et al. | |
| 8,154,553 B2 | 4/2012 | Peterfreund | |
| 8,264,493 B2 | 9/2012 | Peterfreund | |
| 8,385,420 B2 | 2/2013 | Lee et al. | |
| 8,493,513 B2 | 7/2013 | Sullivan | |
| 8,633,940 B2 | 1/2014 | Pothana | |
| 8,995,527 B2 | 3/2015 | Panchal et al. | |
| 2007/0019740 A1 | 1/2007 | Budagavi | |
| 2009/0257665 A1* | 10/2009 | Kato | H04N 19/105 382/233 |
| 2012/0163473 A1 | 6/2012 | Laroche et al. | |
| 2012/0230401 A1 | 9/2012 | Chen et al. | |
| 2013/0271567 A1 | 10/2013 | Lee et al. | |
| 2013/0322537 A1* | 12/2013 | Rossato | H04N 19/63 375/240.16 |
| 2014/0003491 A1 | 1/2014 | Chen et al. | |
| 2014/0003493 A1 | 1/2014 | Chen et al. | |
| 2014/0086328 A1 | 3/2014 | Chen et al. | |
| 2014/0192886 A1* | 7/2014 | Fran Ois | H04N 19/503 375/240.16 |
| 2014/0254661 A1 | 9/2014 | Saxena et al. | |
| 2014/0254670 A1 | 9/2014 | Kwon et al. | |
| 2014/0294314 A1 | 10/2014 | Lu | |
| 2014/0301454 A1 | 10/2014 | Zhang et al. | |
| 2014/0321548 A1 | 10/2014 | Park et al. | |
| 2015/0010070 A1 | 1/2015 | Yamauchi | |
| 2015/0016547 A1 | 1/2015 | Tabatabai et al. | |
| 2015/0124883 A1 | 5/2015 | Inada et al. | |
| 2015/0245049 A1 | 8/2015 | Lee et al. | |
| 2015/0245069 A1 | 8/2015 | Naito | |
| 2015/0341614 A1 | 11/2015 | Senoh et al. | |
| 2016/0335127 A1* | 11/2016 | Artmeier | G06F 9/5044 |

FOREIGN PATENT DOCUMENTS

| | | |
|---|---|---|
| KR | 10-2009-0103663 | 10/2009 |
| KR | 10-2012-0018906 | 3/2012 |
| KR | 10-2013-0116777 | 10/2013 |
| KR | 10-2014-0043032 | 4/2014 |
| KR | 10-2015-0087207 | 7/2015 |
| WO | 2014/106915 | 7/2014 |
| WO | 2015/009693 | 1/2015 |

OTHER PUBLICATIONS

Schwarz et al., "Overview of the Scalable Video Coding Extension of the H.264/AVC Standard," IEEE Transactions on Circuits and Systems for Video Technology, Sep. 2007, pp. 1103-1120, vol. 17, No. 9.

International Telecommunication Union, "Recommendation ITU-T H.264 Advanced video coding for generic audiovisual services," Feb. 2014.

International Telecommunication Union, "Recommendation ITU-T H.265 High efficiency video coding," Apr. 2015.

\* cited by examiner

METHOD, APPLICATION PROCESSOR, AND MOBILE TERMINAL FOR PROCESSING REFERENCE IMAGE

BACKGROUND

Field

Example embodiments relate to video coding or video compression, and, more particularly, to a method and apparatus for processing a reference image.

Background

Various electronic devices use still images and video images and the quantity of image data used by electronic devices has significantly increased. For example, a large quantity of video content and image data is distributed via broadcasting channels using various devices, such as mobile phones. Advances in video encoding/decoding have enabled transmission of more pieces of image data through bandwidth-limited channels and storage of high-resolution video data in a limited storage capacity. More efficient video coding schemes have served a critical role in the rapid growth of video usage. It is recognized, however, that to achieve higher coding efficiency and higher resolution, the number of computations and pixel processing rate must also generally increase. The High Efficiency Video Coding (HEVC) standard was developed to address such challenges.

The HEVC codec is designed to include various features similar to those of its predecessors and extensions, such as H.263, H.264, MPEG-1, MPEG-2, MPEG-4, Scalable Video Coding (SVC), and Multi-view Video Coding (MVC). Such video codecs at least use spatial and temporal redundancies in a series of video image frames to reduce the data bit stream size. Generally, spatial prediction is used to reduce spatial redundancy by using samples in the same image frame, and inter-picture prediction is used to reduce temporal redundancy. This enables compression of image data for relatively effective and efficient transmission and/or storage of video content. Current HEVC techniques (and its extensions and predecessors), however, do not provide a solution for enhanced video coding with respect to various types of object motions in video content.

The above information disclosed in this Background section is only for enhancement of understanding of the background of the inventive concept, and, therefore, it may contain information that does not form the prior art that is already known to a person of ordinary skill in the art.

SUMMARY

One or more example embodiments provide a method and apparatus for processing a reference image.

Additional aspects will be set forth in the detailed description which follows, and, in part, will be apparent from the disclosure, or may be learned by practice of the inventive concept.

One or more example embodiments provides a method of an application processor including a processor, a video coder, a memory, and a graphic processing unit (GPU). The method includes modifying, based on a modification parameter, a reference image to generate a modified reference image, the reference image being configured to be stored in the memory, and determining motion information associated with a coding block of a current image, the current image and the reference image being temporally different. The motion information is associated with at least one of the modification parameter and the modified reference image.

The modifying the reference image may include changing at least one of a level of detail (LOD) of the reference image and a size of the reference image, and determining a prediction block of the modified reference image. The prediction block may be associated with a modified image object in the modified reference image, and the modified image object may be modified by a change in at least one of the LOD and the size.

The determining the motion information may include determining a motion vector based on a coordinate of the prediction block associated with the modified image object and a coordinate of the coding block of the current image. The coding block of the current image may be associated with a zoomed image object matched with the modified image object. The motion vector may be further determined based on a scaling ratio associated with modifying the reference image. Further, the AP may extract the motion vector and information associated with the scaling ratio.

The modifying the reference image may include rotating at least a portion of the reference image, and determining a prediction block of the modified reference image. The prediction block may be associated with a modified image object in the modified reference image, and the modified image object may be modified by a rotation of the at least a portion of the reference image.

The determining the motion information may include determining a motion vector based on a coordinate of the prediction block associated with the modified image object and a coordinate of the coding block of the current image. The coding block of the current image may be associated with a rotated image object matched with the modified image object. The motion vector may be further determined based on a rotation degree used in the modifying of the reference image. Further, the AP may extract the motion vector and information associated with the rotation degree.

The modifying the reference image may include shearing at least a portion of the reference image, and determining a prediction block of the modified reference image. The prediction block may be associated with a modified image object in the modified reference image, and the modified image object may be modified by a shear of the at least a portion of the reference image.

The determining the motion information may include determining a motion vector based on a coordinate of the prediction block associated with the modified image object and a coordinate of the coding block of the current image. The coding block of the current image may be associated with a sheared image object matched with the modified image object. The motion vector may be further determined based on a shearing parameter associated with modifying the reference image. Further, the AP may extract the motion vector and information associated with the shearing parameter.

According to one or more example embodiments, the AP may determine a value of a reference image modification flag. The reference image modification flag indicates a reference image modification for inter-image prediction.

The AP may perform inter-image prediction for the coding block of the current image based on at least one of the motion information and the modified reference image.

One or more example embodiments provides an application processor (AP) including a processor, a video coder, a memory configured to store a reference image, and a graphic processing unit (GPU). At least one of the processor and the video coder is configured to cause the AP to modify, based on a modification parameter, the reference image to generate a modified reference image, and determine motion information associated with a coding block of a current image, the current image and the reference image being temporally different. The motion information is associated with at least one of the modification parameter and the modified reference image.

One or more example embodiments provides an application processor (AP) including a processor configured to operate an operating system, the processor including a plurality of central processing units, a video coder configured to determine a prediction mode for a coding block of a current image between an intra-prediction mode and an inter-prediction mode, the video coder including an intra predictor and an inter predictor, a memory configured to store a reference image, the current image and the reference image being temporally different, and a graphic processing unit (GPU). The video coder is configured to determine, in the inter-prediction mode, a modification parameter to modify a reference image, the modification parameter including a scaling parameter and a rotation parameter, and to generate a modified reference image via rotation, based on the rotation parameter, of at least a portion of the reference image and via change, based on the scaling parameter, of at least one of a level of detail (LOD) and a size of the reference image. The inter predictor of the video coder is configured to determine motion information associated with the coding block of the current image and a prediction block of the modified reference image, the motion information being configured to enable a determination of a residual value between the coding block of the current image and the prediction block of the modified reference image.

The reference image may include a first reference image and a second reference image. The rotated portion of the reference image may include a modification of an object in the first reference image, the modification being based on the rotation parameter. A modification of the second reference image may include at least one of a modified LOD and a modified size of an object in the second reference image, the modified LOD and the modified size being based on the scaling parameter.

At least one of the processor and the video coder may further be configured to cause the AP at least to shear at least a portion of the reference image, and determine a prediction block of the sheared reference image. An object in the sheared reference image may include a shear of the at least a portion of the reference image.

One or more example embodiments provides a mobile terminal. The mobile terminal includes a system-on-chip including a processor configured to operate an operating system, a video coder, a memory to store a reference image, and a graphic processing unit (GPU). The mobile terminal further includes a network interface configured to communicate with another electronic device and a display. The video coder is configured to cause the mobile terminal to modify, based on a modification parameter, the reference image to generate a modified reference image, and determine motion information associated with a coding block of a current image, the current image and the reference image being temporally different. The motion information is associated with at least one of the modification parameter and the modified reference image.

One or more example embodiments provides a mobile terminal. The mobile terminal includes a system-on-chip including a processor configured to operate an operating system, a video coder, a memory to store a reference image, and a graphic processing unit (GPU). The mobile terminal further includes a network interface configured to communicate with another electronic device and a display. At least one of the processor and the video coder is configured to cause the mobile terminal to estimate motion of an object based on images, modify, based on a modification parameter, a reference image to generate a modified reference image, store the modified reference image for association with motion information and inter-image prediction, and perform the inter-image prediction for a coding block of a current image based on the modified reference image, the current image and the reference image being temporally different.

The foregoing general description and the following detailed description are example and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate example embodiments of the inventive concept, and, together with the description, serve to explain principles of the inventive concept.

DETAILED DESCRIPTION OF THE ILLUSTRATED EMBODIMENTS

Figure 1:
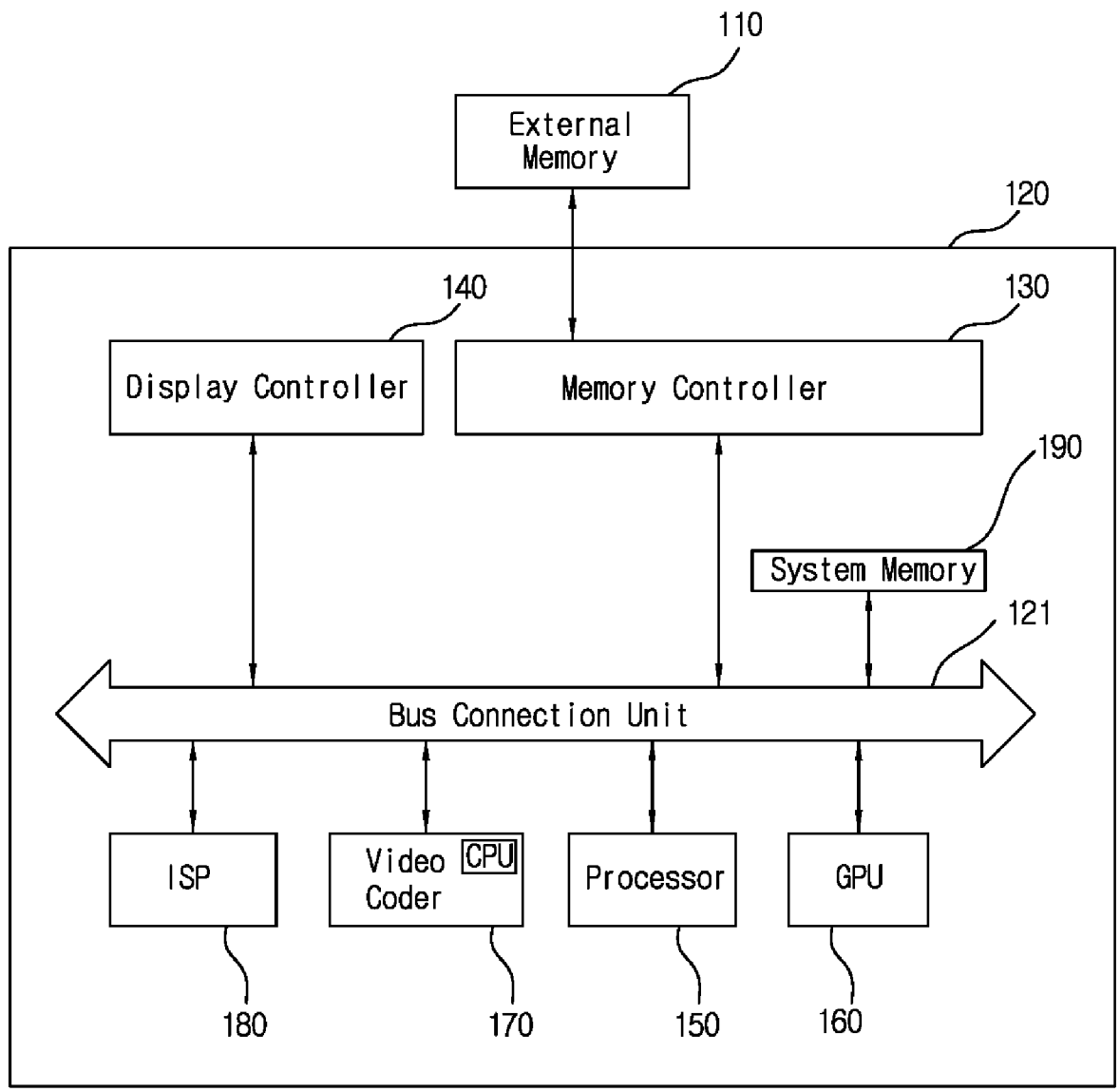
FIG. 1 is a block diagram of an application processor (AP) including a video coder, according to one or more example embodiments.

In the following description, for the purposes of explanation, numerous specific details are set forth in order to provide a thorough understanding of various example embodiments. It is apparent, however, that various example embodiments may be practiced without these specific details or with one or more equivalent arrangements. In other instances, well-known structures and devices are shown in block diagram form in order to avoid unnecessarily obscuring various example embodiments.

In the accompanying figures, the size and relative sizes of blocks, components, elements, etc., may be exaggerated for clarity and descriptive purposes. Also, like reference numerals may denote like or similar elements.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various example embodiments may be described herein with reference to sectional illustrations that are schematic illustrations of idealized example embodiments and/or intermediate structures. As such, variations from the shapes of the illustrations are to be expected. Thus, example embodiments disclosed herein should not be construed as limited to the particular illustrated shapes of components, regions, etc., but are to include deviations in shapes. As such, the regions illustrated in the drawings are schematic in nature and their shapes are not intended to illustrate the actual shape of a region and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

FIG. 1 is a block diagram of an application processor (AP) including a video coder, according to one or more example embodiments.

Referring to FIG. 1, the AP 120 may be configured as a system-on-chip (SoC). In this manner, the AP 120 may be connected to an external memory 110 through a memory controller 130 included in the AP 120; however, the external memory 110 may be integrated as part of the SoC, which includes the AP 120. Further, the AP 120 may include the memory controller 130, a display controller 140, a processor 150, a graphic processing unit (GPU) 160, a video coder 170, an image signal processor (ISP) 180, and a system memory 190. The video coder 170 may include an internal memory, which may include a picture buffer to store a reference image.

Although specific reference will be made to the above-noted implementation of the AP 120, it is also contemplated that the AP 120 may embody many forms and include multiple and/or alternative components. For example, it is contemplated that the components of the AP 120 may be combined, located in separate structures, and/or separate locations. It is also noted that the functionality, use, structure, etc., of the AP 120 may be modified to the extent that the AP 120 may function as a video coder (or include a video coding function), which may be implemented in one or more general-purpose and/or special-purpose computing environments or architectures. In this manner, and as previously mentioned, portion(s) or function(s) of the video coder 170 may be combined, distributed to a separate module that communicates with the video coder 170, and/or the like.

The external memory 110 may be controlled through the memory controller 130 in the AP 120. The external memory 110 may include at least one of a static random-access memory (SRAM), a magnetoresistive random-access memory (MRAM), an embedded dynamic RAM (embedded DRAM), etc.; however, aspects of external memory 110 are not limited thereto. Any suitable storage device (or repository) may be connected to the AP 120 through any suitable I/O interface (not shown), which may be wired or wireless.

The display controller 140 may be connected to a display (not shown) through an interface so that images can be displayed via the display.

The processor 150 may include a microprocessor including hardware, software, and/or firmware, which processes various tasks and operates an operating system (OS). The processor 150 may include a plurality of processing cores (e.g., central processing unit (CPU) cores), and cache memory. According to one or more example embodiments, a graphic processing unit (GPU) 160 may be connected to the bus connection unit 121 and may be configured to handle one or more processes (e.g., a series and/or simultaneous processes) related to video data processing. In this manner, the GPU 160 may also be configured to handle one or more threads associated with video data processing, which may be performed via single threading or multithreading configuration. The GPU 160 may include a control unit configured to calculate (or otherwise determine) and compare graphic-related data. The GPU 160 may also be configured to analyze and execute a command(s) on behalf of the processor 150.

Image signal processor (ISP) 180 is coupled to bus connection unit 121 and processes the signal(s) generated by, for instance, an image sensor (not shown). For example, the image signal processor 180 may process data from the image sensor for storing the data in a memory, e.g., a memory of (or associated with) the ISP 180, the system memory 190, etc. For instance, the image signal processor 180 may compress and determine a file format for an image to be stored in within the memory. The ISP 180 may include a Bayer processing unit, a red/green/blue (RGB) processing unit, a scaling/rotating/affine-transform processing unit, and/or any other suitable processing unit. A process of each unit may be controlled by the ISP 180 via control of the size of an image, the depth of a color, a lens shading compensation, an adaptive color interpolation, a color correction, etc. Image data processed by the ISP 180 may be transmitted to the video coder 170 via the bus connection unit 121.

The video coder 170 may include one or more software and/or hardware components of a video coder-decoder (codec). The video coder 170 may include a processor, e.g., a CPU, that is configured to process one or more of the functions of the video encoder and/or video decoder described herein. Example embodiments, however, are not limited thereto. Further, one or more functions of the video encoder and/or video decoder and other image processing may be performed by one or more other modules of the AP 120, e.g., the ISP 180, an external video codec communicative coupled to the AP 120, etc. Various data processed by the video coder 170 may be stored in a memory of (or associated with) the video coder 170, the system memory 190, the external memory 110, etc. For example, a picture buffer may be utilized to store reference images and/or modified reference images that are described in more detail below. In this manner, the picture buffer may be physically and/or logically provisioned as part of the memory of the video coder 170, the system memory 190, the external memory 110, etc.

Figure 2:
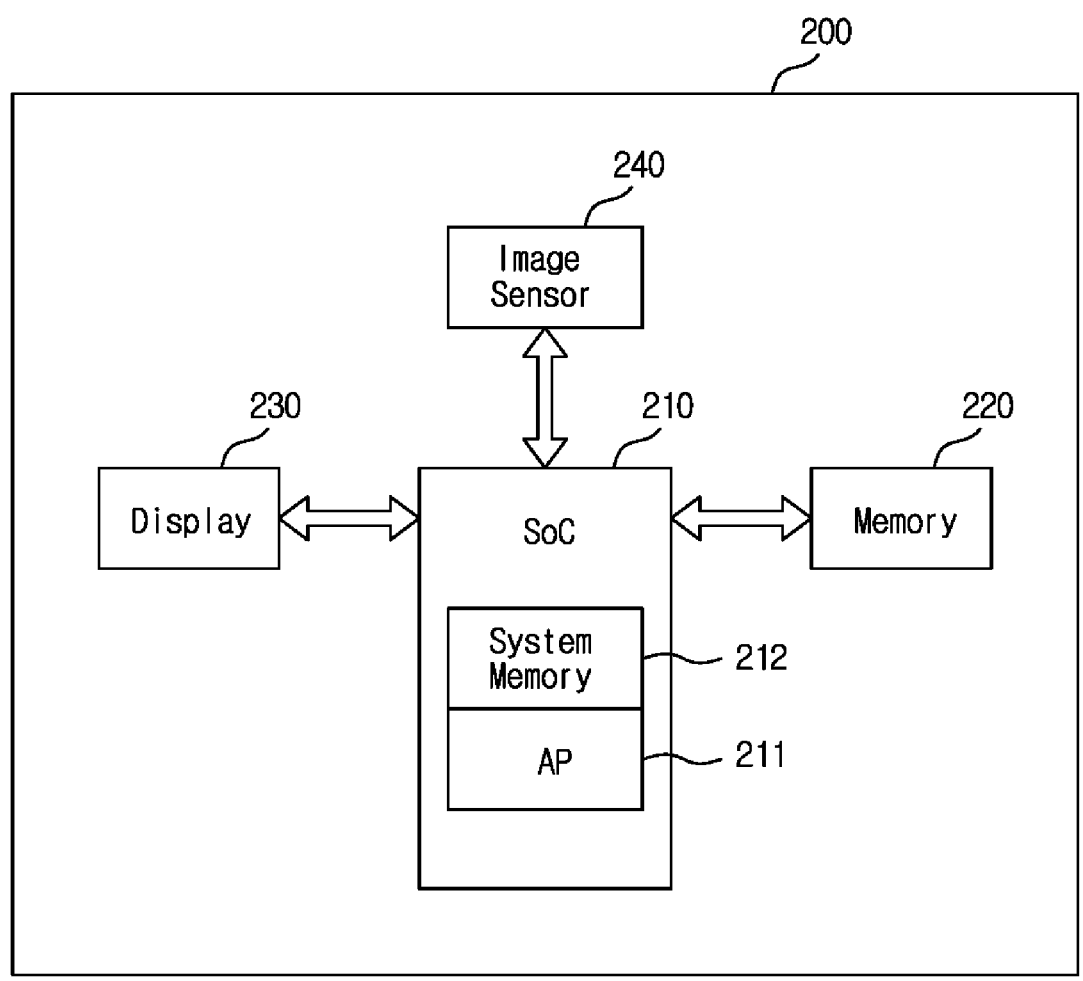
FIG. 2 is a block diagram of an electronic device including a video coder, according to one or more example embodiments.

FIG. 2 is a block diagram of an electronic device including a video coder, according to one or more example embodiments.

Referring to FIG. 2, the electronic device 200, e.g., a mobile terminal, includes a system-on-chip (SoC) 210 and at least one memory 220. The memory 220 may be a flash memory, e.g., a NAND flash memory, a low-power double data rate (LPDDDRx) memory integrated circuit (IC), but aspects are not limited thereto. For instance, an SRAM, MRAM, an embedded DRAM, and/or other storage devices may be connected to (or incorporated as part of) the SoC 210. The SoC 210 may execute computer-executable instructions and may include one or more virtual processors in addition to at least one real processor. The SoC 210 may include an application processor (AP) 211 and a system memory 212, which may be included in the SoC 210 and communicates with the AP 211. For example, the AP 211 may include one or more of the components described in association with AP 120 of FIG. 1. It is contemplated, however, that aspects of SoC 210 are not limited thereto.

A display 230 may be connected to the SoC 210 via an interface and may display various images, e.g., video images, according to the control of the SoC 210. An image sensor 240, e.g., a complementary metal-oxide-semiconductor (CMOS) image sensor (CIS), other type of digital camera, etc., may be connected to the SoC 210, and may provide video image data to image processing module(s) of the SoC 210, e.g., an ISP (not shown), a video coder (not shown), etc. If the electronic device 200 includes multi-processors, the multi-processors may execute different sets of instructions associated with functions and/or operations described herein.

The memory 220 (or any other suitable memory communicatively coupled to electronic device 200) may be any medium that participates in providing code to one or more software, hardware, and/or firmware components for execution. Such memory 220 may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire, and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, register, cache, or any other medium from which information may be read by, for example, a controller/processor. The memory 220 may store at least part of software components and data associated with the video coder. Throughout the specification, the video coder may refer to a video encoder, a video decoder, or a video codec.

The electronic device 200 may include other components, such as one or more input/output (I/O) devices (not shown), a network interface (not shown), a modem processor (not shown), etc. The modem processor may enable mobile communication with a base station, and may be included as part of the SoC 210 or as part of the AP 211. The internal hardware components may be connected through connectors, such as a bus, controller, etc. Further, OS software supports an operating environment for various application programs to be executed by the electronic device 200 and controls activities of the components of the electronic device 200.

The I/O devices (not shown) may be connected to the AP 211 and may include a touch input interface, a keyboard, a mouse, a stylus pen, a voice input module, a camera, and/or the like. For audio and video coding, the I/O devices may include a sound processing component and a video processing component. For example, an image signal processor (not shown) may be included as part of the electronic device 200 and may execute some operations for video coding. Original pictures may be processed by the image signal processor in association with the image sensor 240, and the original pictures may be encoded by a video encoder. The I/O devices may include the display 240, a speaker, and/or the like, or may include an interface to connect an external display, an external printer, an external transducer (e.g., speaker), etc.

The network interface (not illustrated) may enable communication over any suitable communication medium to another device or entity. In this manner, the communication may be a wired communication or a wireless communication. As such, the network interface may be configured as a wireless modem and/or an Ethernet interface. For example, the network interface may include a radio frequency (RF) communication interface in association with one or more antennas and RF modules that establish radio communication with one or more base stations. The network interface may include a short-range wireless communication interface, such as Near Field Communication (NFC) module(s), Bluetooth® communication module(s), ZigBee® module(s), and the like. The communication protocols are not limited thereto, and may include any suitable wired and/or wireless communication techniques implemented with an electrical, infrared, optical, or other carrier.

Figure 3:
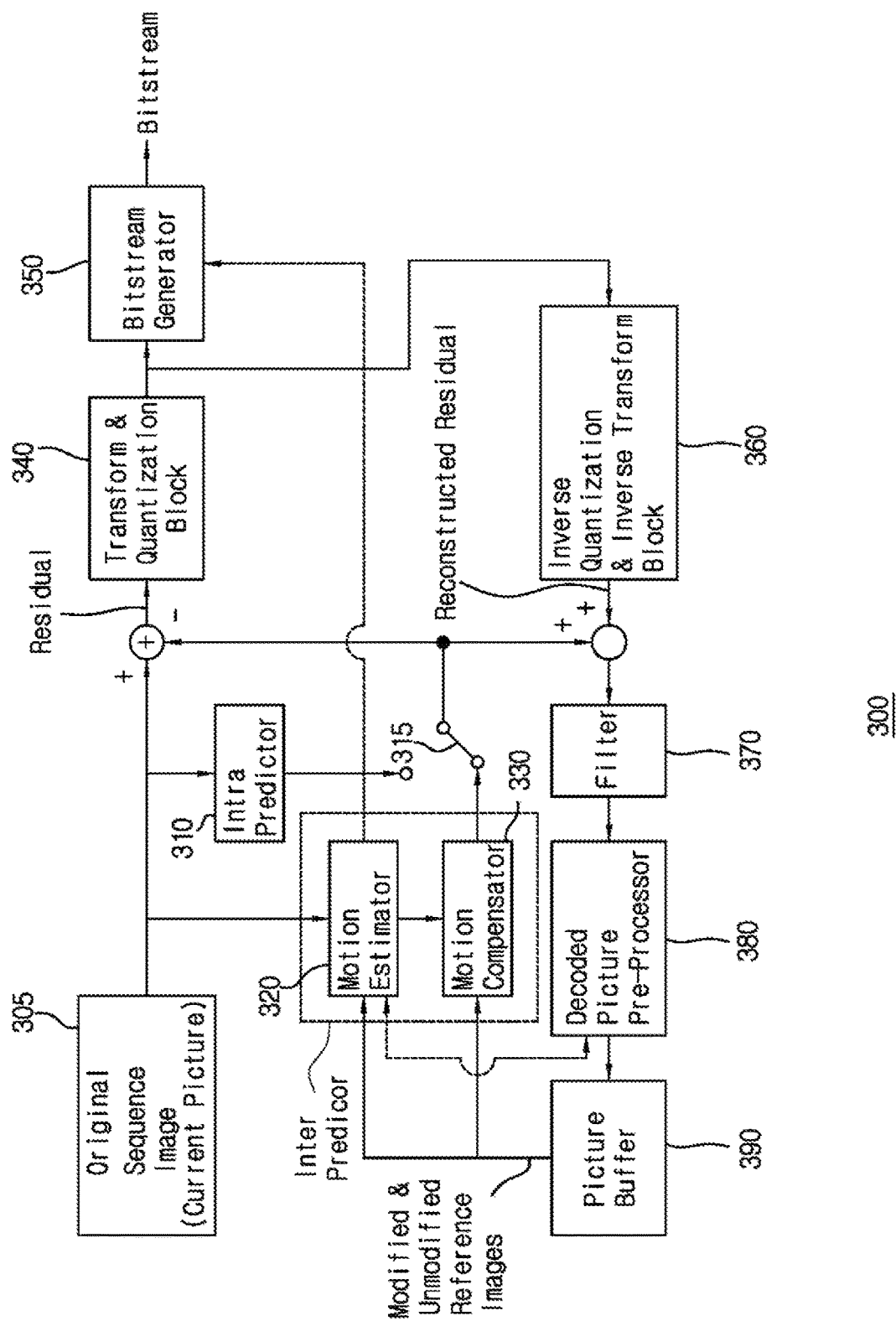
FIG. 3 is a block diagram of a video encoder, according to one or more example embodiments.
Figure 4:
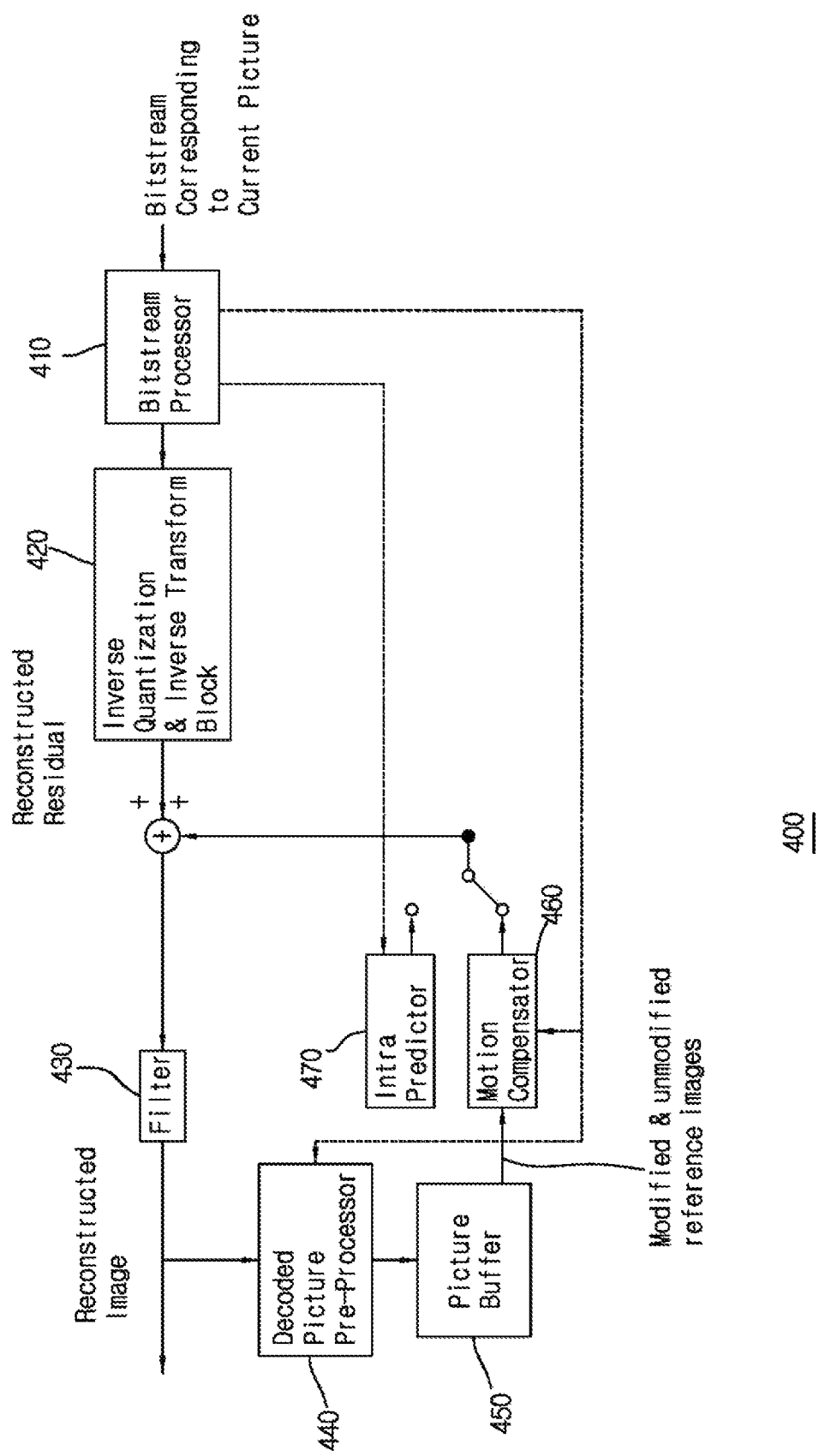
FIG. 4 is a diagram of a video decoder, according to one or more example embodiments.

FIG. 3 is a block diagram of a video encoder, according to one or more example embodiments. FIG. 4 is a block diagram of a video decoder, according to one or more example embodiments. However, implementations are not limited thereto. At least part of the components may be modified or removed, and additional components may be added. Depending on various conditions and types of compression, modules of the video encoder 300 and the decoder 400 may be added, modified, omitted, split into multiple modules, combined with other modules, and/or replaced with like modules.

The video encoder 300 and the video decoder 400 process video pictures, which may be image frames, video fields, etc. The bitstream syntax and the block partitioning schemes may vary according to various video coding standards and schemes. For example, the video encoder 300 and the decoder 400 may have a block-based processing unit, and may use a 4:2:0 macroblock format for frames, each macroblock including four 8×8 luminance blocks (or one 16×16 luminance block) and two 8×8 chrominance blocks. The luminance block(s) and the chrominance blocks may use YUV color space formats, e.g., YCbCr, YPbPr, etc.

According to one or more example embodiments, the macroblocks may be used as basic processing units. For each macroblock of a picture, a coding mode may be selected by the video encoder 300. The selected macroblock coding mode determines whether all samples of a macroblock are predicted using intra-image prediction (this may be referred to as intra-picture prediction or intra prediction) or inter-image prediction (this may be referred to as inter-picture prediction, inter prediction, or motion compensated prediction). Each of the video encoder 300 and the video decoder 400 may use a different macroblock or block format, or perform operations on different size or configuration than 8×8 blocks and 16×16 macroblocks. For example, the macroblock may be partitioned into sub-blocks that are used for inter-image prediction or intra-image prediction. Further, like HEVC, a block larger than a 16×16 macroblock may be used for inter-image prediction or intra-image prediction.

In HEVC, each picture is partitioned into square-shaped coding tree blocks (CTBs), such that the resulting number of CTBs is identical for both the luminance (or luma) and chrominance (or chroma) picture components. Each CTB of luma samples, associated two CTBs of chroma samples, and the syntax associated with these sample blocks is subsumed under a coding tree unit (CTU). The CTU may also be a basic processing unit for inter-image prediction and other processing, for example. If the video encoder 300 adopts a block partitioning scheme similar to HEVC, the video encoder 300 may choose the CTU size (e.g., 16×16, 32×32, 64×64, etc.) that provides the best performance for the targeted computing environment, and smaller coding units (CUs) split from the CTU and prediction units (PUs) may be used. For example, if a CU is coded using inter-image prediction, the luma and chroma coding blocks (CBs) contained in a CU may be further split into prediction blocks (PBs). A PB may be a block of samples of the luma or a chroma component that uses the same motion parameters for motion-compensated prediction. The luma PB and chroma PBs, together with the associated syntax, may form a PU. However, the video encoder 300 and the decoder 400 may have different block partitioning schemes according to various example embodiments.

Referring to FIG. 3, the video encoder 300 may include an intra predictor 310, a motion estimator 320, a motion compensator 330, a transform and quantization block 340, a bitstream generator 350, an inverse quantization and inverse transform block 360, a filter 370, a decoded picture preprocessor 380, and a picture buffer 390.

The video encoder 300 receives a sequence of video images (e.g., pictures) including a current image (or picture) 305. The sequence of video images may include progressive video frame and/or other formats of video frames to output a bitstream as compressed video information. For the received current image 305, a block partitioning (not shown) may be performed, such that an inter-image prediction or an intra-image prediction is performed based on the partitioned block as a processing unit. The video encoder 300 may perform encoding processes for intra-image prediction or inter-image prediction. As shown in FIG. 3, switch 315 indicates that a current block may be encoded using either an intra-image prediction using the intra predictor 310 or an inter-image prediction.

Each image frame may be categorized based on various criteria. With respect to reference pictures used for prediction, the image frames may be categorized into I-frame, P-frame, and B-frame categorize similar to some video coding standards. However, the constraints of the frame type may be slightly different in different video coding schemes.

Generally, an I-frame may be an intra-coded video frame without using another image frame as a reference image frame. For instance, an I-frame does not involve prediction from one or more other previously decoded pictures temporally different from the current I-frame. A P-frame may be a video frame coded using uni-directional prediction from one or more reference pictures. For example, a P-frame may be predicted from previously decoded reference frame(s). A B-frame may be a video frame coded using bi-directional prediction from a plurality of pictures. Thus, the I-frames can only be predicted using intra-image prediction. At least some blocks of a P-frame and B-frame can be predicted using inter-image prediction. The difference ("residual") between the coding block of the current image 305 and a prediction block of a reference image frame may be derived. This may reduce the quantity of information to be encoded.

If the current image 305 is not an I-frame, such as an intra random access point (IRAP) picture in HEVC, inter-image prediction may be available. The current image 305 is available for inter-image prediction using a motion estimator 320 and a motion compensator 330. In general, the motion estimator 320 may estimate a motion between the coding block of the current image 305 and reference image(s) stored in, for instance, a picture buffer 390. The reference image(s) stored in the picture buffer 390 are image frames previously decoded before the coding process of the current image 305. However, the display order of at least one of the reference images may be later than the display order of the current image 305. For example, picture order count (POC) of a reference image may be greater than the current image 305. The POC identifies the display order of decoded image frames even if the decoding order is different from the display order. If more than one block, e.g., multiple areas of pixels to be used for inter-image prediction, is identified from the reference image(s) as predictors of the coding block of the current image 305, the predictors may be merged to generate a single prediction.

Generally, the reference images are image frames in the video sequence that have already been coded and then reconstructed for display. Motion estimator 320 may estimate motion by full sample, half sample, quarter sample, and the like. If scalable video coding is available for predetermined multiple coding resolutions, the resolution of the reference images may be changed by downsampling with layers of different resolutions, such that different quality of video images can be coded and reproduced according to different layers. Resampling filters can be used for multiple resolutions of video content coding, and resampling of the residual between at least two layers of different resolution may be performed based on prediction of higher resolution signals between the at least two layers.

In each spatial layer, motion-compensated prediction and intra-image prediction may be employed, such as employed in single-layer coding. Further, coding efficiency may be improved via inter-layer prediction, such that a lower resolution picture of an image frame may be used to predict a higher resolution picture of the same image frame. As a result, the motion estimator 320 may output motion information, such as motion vector information and a reference picture index. Advanced motion vector prediction (AMVP), a merge mode for motion vector coding, skipped and direct motion inference of HEVC and its predecessors may also be used according to various example embodiments. Motion information may be coded based on predefined syntax and entropy-coded by the bitstream generator 350.

Based on the motion information, the motion compensator 330 uses a motion vector and a decoded reference picture stored in a picture buffer 390 to perform a motion compensation in an inter-image prediction process. The motion compensator 330 may use quarter-sample precision for motion vectors, and filters (e.g., 7-tap, 8-tap, etc., filters) may be used for interpolation to obtain fractional sample positions. Further, a filtering by a 6-tap filter of half-sample positions followed by linear interpolation for quarter-sample positions may also be used in certain configurations. Since multiple reference images can be used, for each prediction block, more than one motion vector can be used, and a scaling and offset may be applied to the prediction based on a weighted prediction scheme, such as the weighted prediction scheme used in HEVC and H.264/AVC.

The transform and quantization block 340 may include a transformer and a quantizer. The transform and quantization block 340 may convert the video information into frequency domain data. A discrete cosine transform (DCT), or a variant thereof, may be used to transform a block of sample data received at the input of the transform and quantization block 340. The block of sample data may include prediction residual data, which is the difference between a block of the current image 305 and a predictor output from the motion compensator 330, such as a corresponding block in a searched range of a previously decoded reference image. The transform may use a unit of Transform Unit (TU) and residual quadtree scheme of HEVC, but is not limited thereto. The transform and quantization block 340 may quantize the blocks of frequency-domain data.

The bitstream generator 350 may generate an encoded bitstream by coding the quantized data output from the transform and quantization block 340. The bitstream generator 350 may include an entropy encoder that performs various coding schemes, such as Huffman coding, run-length coding, differential coding, and the like. Coding syntax elements may also be coded by the bitstream generator 350. As an example, the entropy coder may use context adaptive binary arithmetic coding (CABAC) similar to HEVC or other schemes of its predecessors and variations thereof. The encoded bitstream is transmitted to a video decoder.

The output of the transform and quantization block 340 may be provided to an input of the inverse quantization and inverse transform block 360, which may include an inverse quantizer and an inverse transformer. The inverse quantizer may inverse quantize the quantized data, and the inverse transformer may inverse transform the inversed quantized data. The output of the inverse quantization and inverse transform block 360, as a reconstructed residual, may be added to the predictor output from the motion compensator 330 to generate a reconstructed reference image to be filtered before being stored in a decoded picture buffer. A decoded picture buffer stores reference image frames for inter-prediction and future display.

The reconstructed reference image may be filtered by the filter 370. The filter may include a deblocking filter and a Sample Adaptive Offset (SAO) to reduce discontinuities at the block boundaries and attenuate ringing artifacts and sample distortions. It is contemplated, however, that the filter 370 may include other filtering mechanisms to compensate errors and losses of the original sequence image. The video encoder 300 may perform a block-based lossy coding without additional lossless coding scheme, or perform a lossless coding.

The decoded image (or picture) pre-processor 380 may store the filtered reference image in a decoded picture buffer without modification or modify the filtered reference image. The modified reference image may be stored in a modified picture buffer of the picture buffer 390. The picture buffer 390 may include the decoded picture buffer for storing unmodified reference images that can be used for inter-image prediction and future display according to the POC of the respective reference images. Further, the picture buffer 390 may include a modified picture buffer for storing modified reference images that can be used for inter-image prediction, but may not be available for display.

According to one or more example embodiments, the modified picture buffer may be separated from the decoded picture buffer or the modified picture buffer, and the decoded picture buffer may be integrated. Modified and unmodified reference images (or "reference pictures") may be provided to at least one of the motion estimator 320 and the motion compensator 330. The motion estimator 320 and the motion compensator 330 may perform operations with respect to unmodified reference pictures. The motion estimation and motion compensation based on the modified reference pictures will be described in more detail in the proceeding paragraphs. The motion estimator 320 may communicate with the decoded image pre-processor 380 to determine reference image modification schemes and modification parameters, which will also be described in more detail in the proceeding paragraphs.

Referring to FIG. 4, the video decoder 400 may include a bitstream processing block (or bitstream processor) 410, an inverse quantization and inverse transform block 420, a filter 430, a decoded image pre-processor 440, a picture buffer 450, a motion compensator 460, and an intra predictor 470.

The bitstream processor 410 may receive a bitstream encoded by the video encoder 300. It is contemplated, however, that the bitstream processor 410 may receive a bitstream from any other suitable source. The bitstream processor 410 may include an entropy decoder to process an entropy decoding of the received bitstream, which may have been entropy-coded by the video encoder 300. The entropy decoding may be an inverse of the entropy encoding performed in the video encoder 300.

The inverse quantization and inverse transform block 420, the filter 430, the decoded image pre-processor 440, the picture buffer 450, the motion compensator 460, and the intra predictor 470 may have substantially the same structure as the inverse quantization and inverse transform block 360, the filter 370, the decoded image pre-processor 380, the picture buffer 390, the motion compensator 330, and the intra predictor 320 of the video encoder 300. Thus, repetitive descriptions will be omitted to avoid obscuring example embodiments described herein. However, unlike the video encoder 300, the inverse quantization and inverse transform block 420, the decoded image pre-processor 440, the motion compensator 460, the intra predictor 470, and other components may receive inputs, such as motion information, from the bitstream processor 410 or an intermediate component once the bitstream processor 410 or the intermediate component processes the bitstream according to a predefined syntax.

Figure 5:
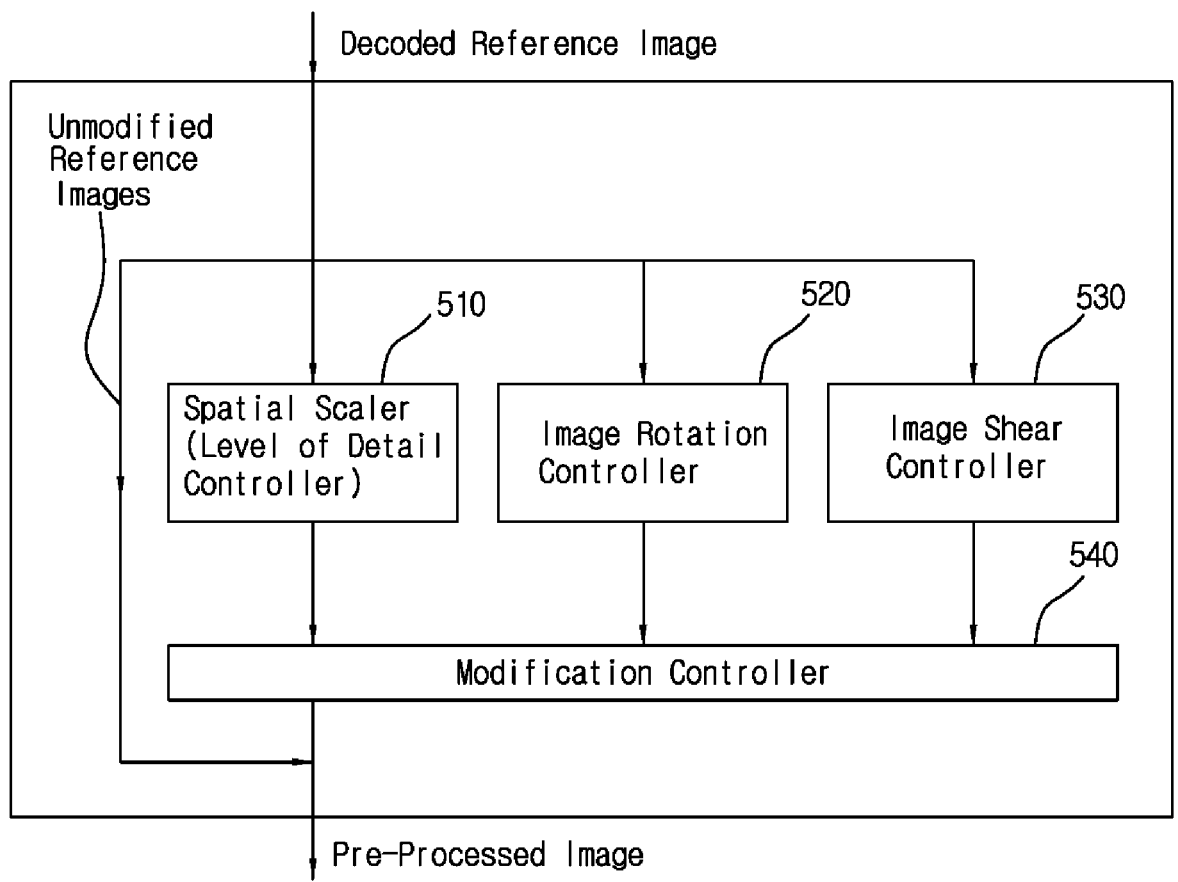
FIG. 5 is a block diagram of a decoded image preprocessor, according to one or more example embodiments.

FIG. 5 is a block diagram of a decoded image pre-processor, according to one or more example embodiments.

Referring to FIG. 5, the decoded image pre-processor 500 may include a spatial scaler 510, an image rotation controller 520, an image shear controller 530, and a modification controller 540. One or more components of the decoded image pre-processor 500 may be omitted, combined, separated, or otherwise modified according to various embodiments. The decoded image pre-processor 500 receives at least a portion of a decoded reference image. As an example, the decoded image pre-processor 500 may receive at least one block of decoded reference image for modification or an entire decoded reference picture frame.

According to one or more example embodiments, the spatial scaler 510 may perform spatial scaling of the received reference image. The spatial scaling may be performed by downsampling or upsampling of the reference image. In this process, the resolution may be changed. Further, at least one of the size and the level of detail (LOD) of the reference image may be changed. For example, when the downsampling is performed, the number of pixels may be reduced and the size of the reference image may be reduced to, for instance, one-fourth of its size each time by reducing the width and height of the reference image by half, respectively (see, e.g., FIG. 6). If the LOD is also changed, each downsampled reference image may have an index, e.g., an LOD index, to indicate the scaled level or the scaled LOD. As a default downsampling, the size of a reference images may be reduced to one-fourth of its size. Further, by setting a parameter and/or a flag, the scaling ratio may be changed, such that the size of the reference image is reduced to, for instance, three-fourths of its size.

An actual scaling ratio may be determined and may be set as a scaling parameter to indicate the scaling ratio of a specific reference image. A scaling parameter (S) may be defined according to Equation 1.

$$S = \frac{\text{Scaled Reference Image Width}}{\text{Unmodified Reference Image Width}} \quad \text{Eq. 1}$$

However, the height ratio may be used as the scaling parameter instead of the width parameter. Further, if the scaling ratio of the width and the scaling ratio of the height are different, both scaling ratios may be defined and applied.

When performing the scaling, various interpolation filters may be used. For example, nearest neighbor, bilinear, bicubic, bicubic smoother, bicubic sharper, etc., and/or a combination thereof may be used.

The spatial scaler 510 may generate a modified reference image corresponding to the size of an object in the modified reference image that matches the size of the object in the current image. For example, the z-axis component of the motion of an object in an image may be identified (zoom-in or zoom-out) by the motion estimator 320, and previous motion information may be used in identifying the z-axis component of the motion of an object. The z-axis may be perpendicular to reference image. In association with x and y components of motion vectors in the spatial plane, the z-axis component of the motion vector may be estimated. It is noted that the motion of an object in adjacent image frames (small POC differences) may be consistent, and, thus, a reference image may be modified using a corresponding scaling ratio to increase the coding efficiency in inter-image prediction using the modified reference image.

The image rotation controller 520 controls rotation of the received reference image. Similar to the scaling parameter of the spatial scaler 510, a rotation parameter may be used to modify the received reference image. The rotation parameter may include a rotation degree of at least one block of a specific reference image. The rotation parameter may further include a parameter corresponding to the center of rotation. For example, the center of rotation may be set as the left-top corner of a reference image. However, example embodiments are not limited thereto. For example, the center of rotation may be the left-top corner or the center of a search range in a reference image frame.

The image shear controller 530 controls the shearing of the received reference image. Similar to the scaling parameter of the spatial scaler 510, a shear parameter may be used to modify the received reference image. The shear parameter may include a shearing degree of at least one block of a specific reference image.

The modification controller 540 may control the combination of at least one of the output of the spatial scaler 510, the image rotation controller 520, and the image shear controller 530. Although not illustrated, other controllers, such as a reflect controller (not shown), which reflects at least one block of a specific reference image, may be configured and combined with (or by) the modification controller 540. Motion vectors may be associated with the above-noted modification parameters, e.g., the scaling parameter, the rotation parameter, and the shear parameter, to constitute motion information. Further, original reference image index, such as the POC, of the unmodified reference image may be further associated with the motion information, or an index of the modified reference image, such as an LOD index, may be associated with the motion information. According to one or more example embodiments, the unmodified reference image may also be output in order to store the unmodified reference image in a picture buffer 390 and/or 450 for display and inter-image prediction. Further details will be described later with reference to other figures.

Figure 6:
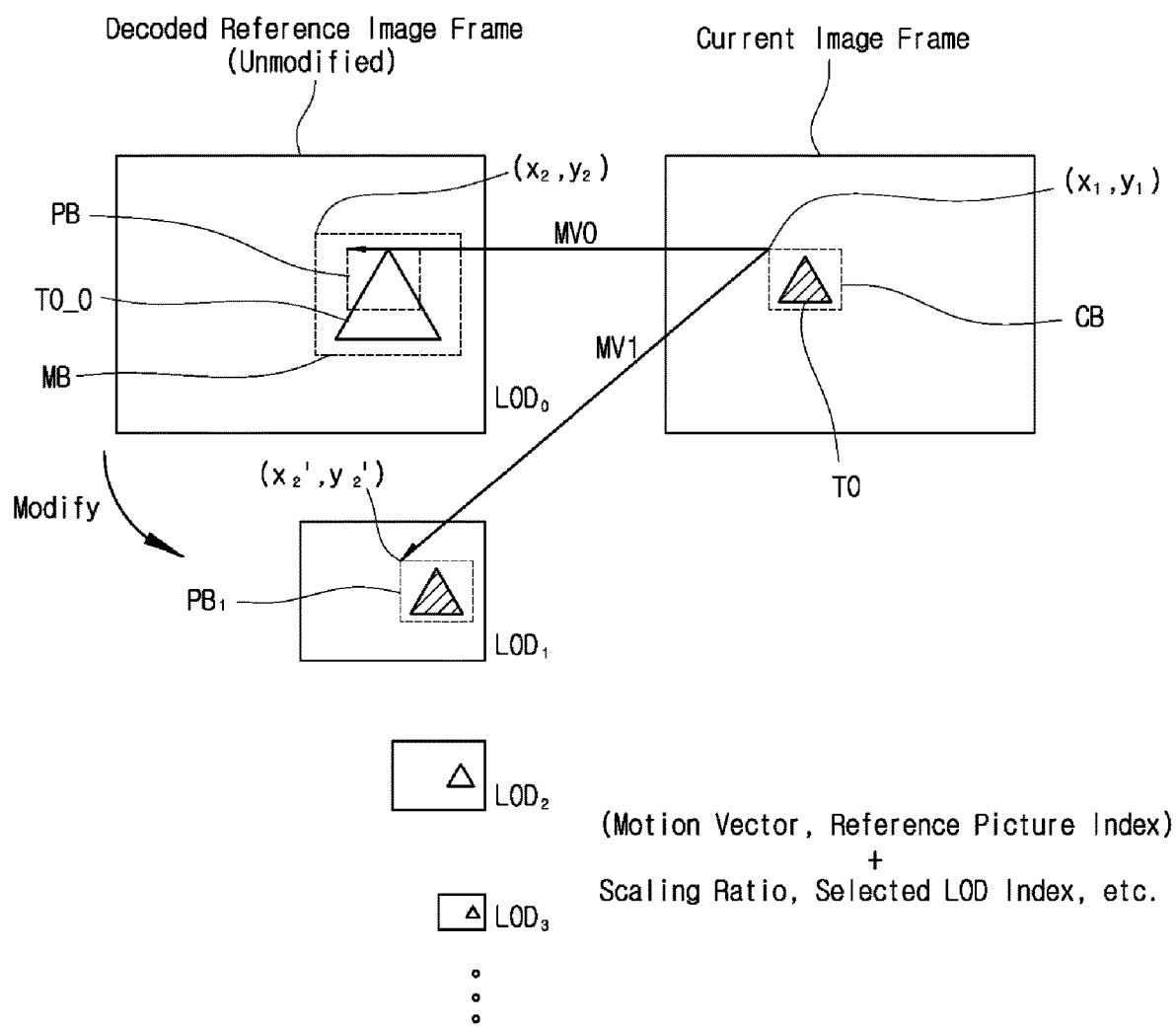
FIG. 6 is a diagram illustrating a modification of a reference image using a scaling parameter, according to one or more example embodiments.

FIG. 6 is a diagram illustrating a modification of a reference image using a scaling parameter, according to one or more example embodiments.

Referring to FIG. 6, the current coding block CB in a current image frame is determined. A target object TO is included in the current coding block CB. The current coding block CB may be determined to include only a portion of the target object TO. According to one or more example embodiments, the target object TO may be identified and a larger block including the entire target object TO may be determined. As such, the larger block may include more than one coding block CB. With respect to the decoded reference image frame $LOD_0$, which is not modified by the decoded image pre-processor 500, a motion vector $MV_0$ ($\Delta x$, $\Delta y$) may be determined by calculating the difference of the coordinate of the top-left corner of the prediction block PB of the decoded reference image frame $LOD_0$ and the coordinate of the top-left corner of the current coding block CB of the current image frame, if a reference image modification is not considered.

As seen in FIG. 6, however, the corresponding target object TO_0 in the decoded reference image frame $LOD_0$ is almost four times larger than the target object TO in the current image frame. Thus, one prediction block PB in the decoded reference image frame $LOD_0$ may not include the entire area of the corresponding target object TO_0. As such, inter-prediction efficiency may not be warranted or intra prediction may be performed instead of performing inter-image prediction.

To increase inter-image prediction efficiency and/or probability, the modified reference image $LOD_1$ having LOD index 1 may be selected for inter-image prediction. The size of the prediction block $PB_1$ of the modified reference image $LOD_1$ may be matched with the size of the current coding block CB of the current image frame; however, example embodiments are not limited thereto. In this manner, the matching block MB of the decoded reference image frame $LOD_0$ scaled to the prediction block $PB_1$ of the modified reference image $LOD_1$ may have a larger size than the current coding block CB of the current image frame.

A modified motion vector $MV_1$ may be obtained based on extended motion parameters, such as a scaling ratio S between the decoded reference image frame $LOD_0$ and the modified reference image $LOD_1$, the coordinate ($x_1$, $y_1$) of the top-left corner of the current coding block CB of the current image frame, and the coordinate ($x_2'$, $y_2'$) of the top-left corner of the prediction block $PB_1$ of the modified reference image $LOD_1$. The scaling ratio may be defined by Equation 2.

$$s = x_2'/x_2 (\text{or } x_2/x_2') \qquad \text{Eq. 2}$$

According to one or more example embodiments, the LOD index of the modified reference image $LOD_1$ and the coordinate ($x_2$, $y_2$) of the top-left corner of the matching block MB of the decoded reference image frame $LOD_0$ may be used as extended motion parameters. The extended motion parameters may be included in motion information and coded according to a predefined syntax. As an example, a motion vector $MV_1$ may be defined according to Equation 3.

$$MV_1 = (S \cdot x_2 - x_1, S \cdot y_2 - y_1), \text{ where } S = x_2/x_2 \text{ or } y_2'/y_2 = \qquad \text{Eq. 3}$$

According to one or more example embodiments, the motion vector MV may be defined according to Equation 4.

$$MV = (S \cdot x_2' - x_1, S \cdot y_2' - y_1), \text{ where } S = x_2/x_2' \text{ or } y_2/y_2' \qquad \text{Eq. 4}$$

When the scaling ratio $S_1$ of the width is different from the scaling ratio $S_2$ of the height, the motion vector MV may be defined according to Equation 5.

$$MV = (S_1 \cdot x_2' - x_1, S_2 \cdot y_2' - y_1), \text{ where } S_1 = x_2/x_2'; S2 = y_2/y_2' \qquad \text{Eq. 5}$$

According to one or more example embodiments, a motion vector MV may be defined by applying the scaling ratio on the coordinate in the current image frame. For example, a motion vector MV may be defined according to Equation 6.

$$MV = x_2' - S \cdot x_1, y_2' - S \cdot y_1), \text{ where } S = x_2'/x_2 \text{ or } y_2'/y_2 \qquad \text{Eq. 6}$$

Figure 7:
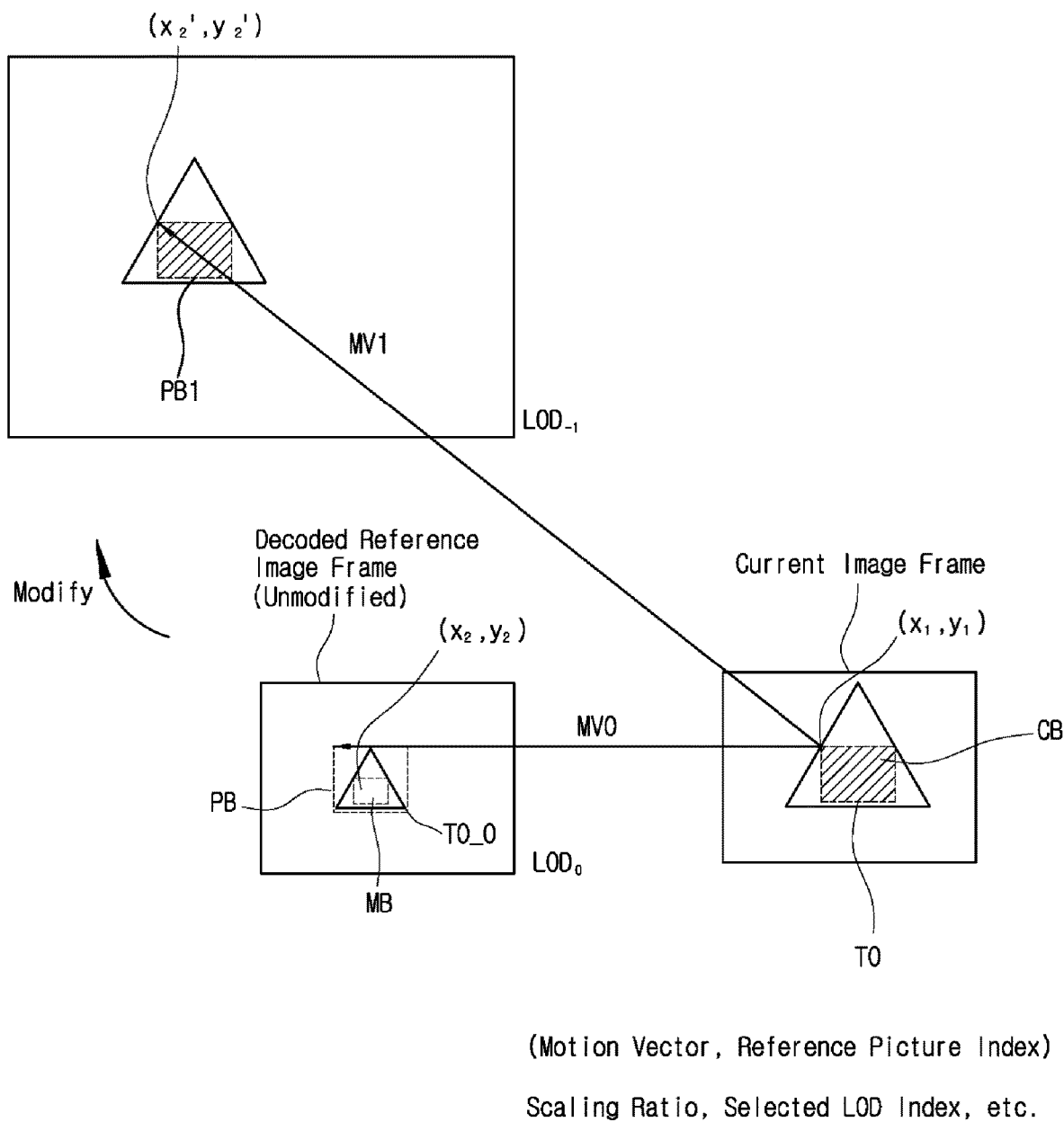
FIG. 7 is a diagram illustrating a modification of a reference image using a scaling parameter, according to one or more example embodiments.

FIG. 7 is a diagram illustrating a modification of a reference image using a scaling parameter, according to one or more example embodiments.

Referring to FIG. 7, the current coding block CB in a current image frame is determined. A portion of a target object TO is included in the current coding block CB. The target object TO may be identified and a larger block including the entire target object TO may be determined. In this manner, the larger block may include more than one coding block CBs. Further, according to one or more example embodiments, the current coding block CB may be determined to include the entire portion of the target object TO. With respect to the decoded reference image frame $LOD_0$, which is not modified by the decoded image pre-processor 500, a motion vector $MV_0$ ($\Delta x$, $\Delta y$) may be determined by calculating the difference of the coordinate of the top-left corner of the prediction block PB of the decoded reference image frame $LOD_0$ and the coordinate of the top-left corner of the current coding block CB of the current image frame, if a reference image modification is not considered.

As shown in FIG. 7, however, the corresponding target object TO_0 in the decoded reference image frame $LOD_0$ is almost one-fourth of the target object TO in the current image frame. Thus, one prediction block PB in the decoded reference image frame $LOD_0$ may be larger than the area of the target object TO in the current coding block CB. Accordingly, inter-prediction efficiency may not be warranted, or intra prediction may be performed instead of inter-image prediction.

To increase inter-image prediction efficiency and/or probability, the modified reference image LOD-1 having LOD index −1 may be selected for inter-image prediction. The size of the prediction block PB1 of the modified reference image LOD-1 may be matched with the size of the current coding block CB of the current image frame; however, example embodiments are not limited thereto. In this manner, the matching block MB of the decoded reference image frame $LOD_0$ scaled to the prediction block $PB_1$ of the modified reference image LOD-1 may have a smaller size than the current coding block CB of the current image frame.

A modified motion vector $MV_1$ may be obtained based on extended motion parameters, such as scaling ratio S (defined by Equation 2) between the decoded reference image frame $LOD_0$ and the modified reference image LOD-1, the coordinate ($x_1$, $y_1$) of the top-left corner of the current coding block CB of the current image frame, and the coordinate ($x_2'$, $y_2'$) of the top-left corner of the prediction block $PB_1$ of the modified reference image LOD-1.

According to one or more example embodiments, the LOD index of the modified reference image LOD-1 and the coordinate ($x_2$, $y_2$) of the top-left corner of the matching block MB of the decoded reference image frame $LOD_0$ may be used as extended motion parameters. The extended motion parameters may be included in motion information and coded according to predefined syntax. As an example, a motion vector $MV_1$ may be defined according to Equation 3. According to one or more example embodiments, the motion vector MV may be defined according to Equation 4 or Equation 6. When the scaling ratio $S_1$ of the width is different from the scaling ratio $S_2$ of the height, the motion vector MV may be defined according to Equation 5.

Figure 8:
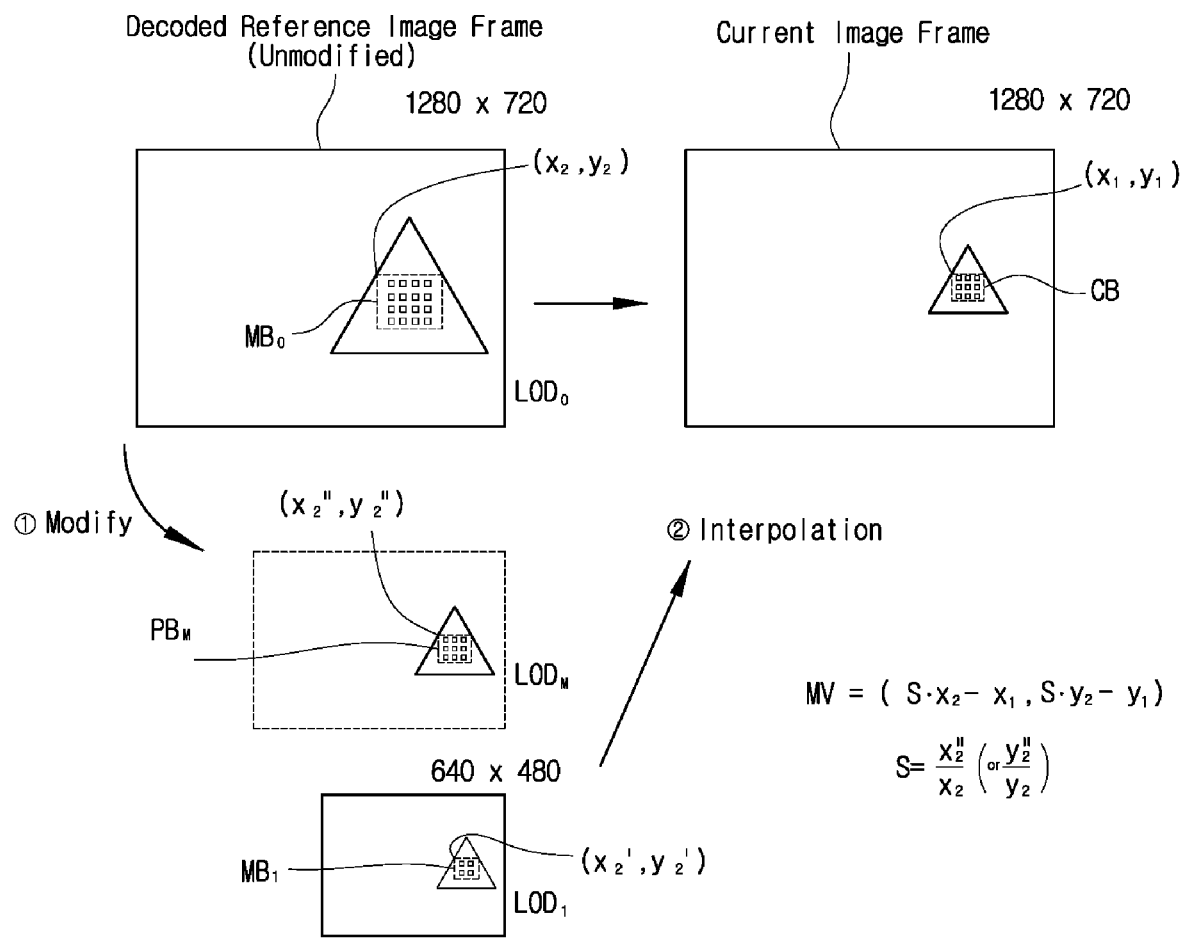
FIG. 8 is a diagram illustrating an inter-image prediction based on an optimized scaling parameter or an interpolation, according to one or more example embodiments.

FIG. 8 is a diagram illustrating an inter-image prediction based on an optimized scaling parameter or an interpolation, according to one or more example embodiments.

Referring to FIG. 8, the decoded reference image $LOD_0$ may be scaled to the modified reference image $LOD_M$. For example, the scaling ratio may be three-quarters, as shown in FIG. 8. Various scaling algorithms, such as nearest-neighbor interpolation, bilinear interpolation, etc., may be used. Sub-pixels may be considered to map 16 pixel values in $LOD_0$ to 9 pixel values in $LOD_M$. For instance, a weighted average value of some of the 16 pixel values in $LOD_0$ may be mapped to each of the 9 pixel values in $LOD_M$. As an example, a motion vector MV may be defined according to Equation 7.

$$MV = (S \cdot x_2 - x_1, S \cdot y_2 - y_1), \text{ where } S = x_2''/x_2 \text{ or } y_2''/y_2 \quad \text{Eq. 7}$$

Further, the location of the prediction block $PB_M$ and 9 pixel values may be determined based on an interpolation of a matching block $MB_0$ of the decoded reference image $LOD_0$ and/or a matching block $MB_1$ of a modified reference image $LOD_1$. For example, nearest neighbor, bilinear, bicubic, bicubic smoother, bicubic sharper, etc., and/or a combination thereof may be used.

Figure 9:
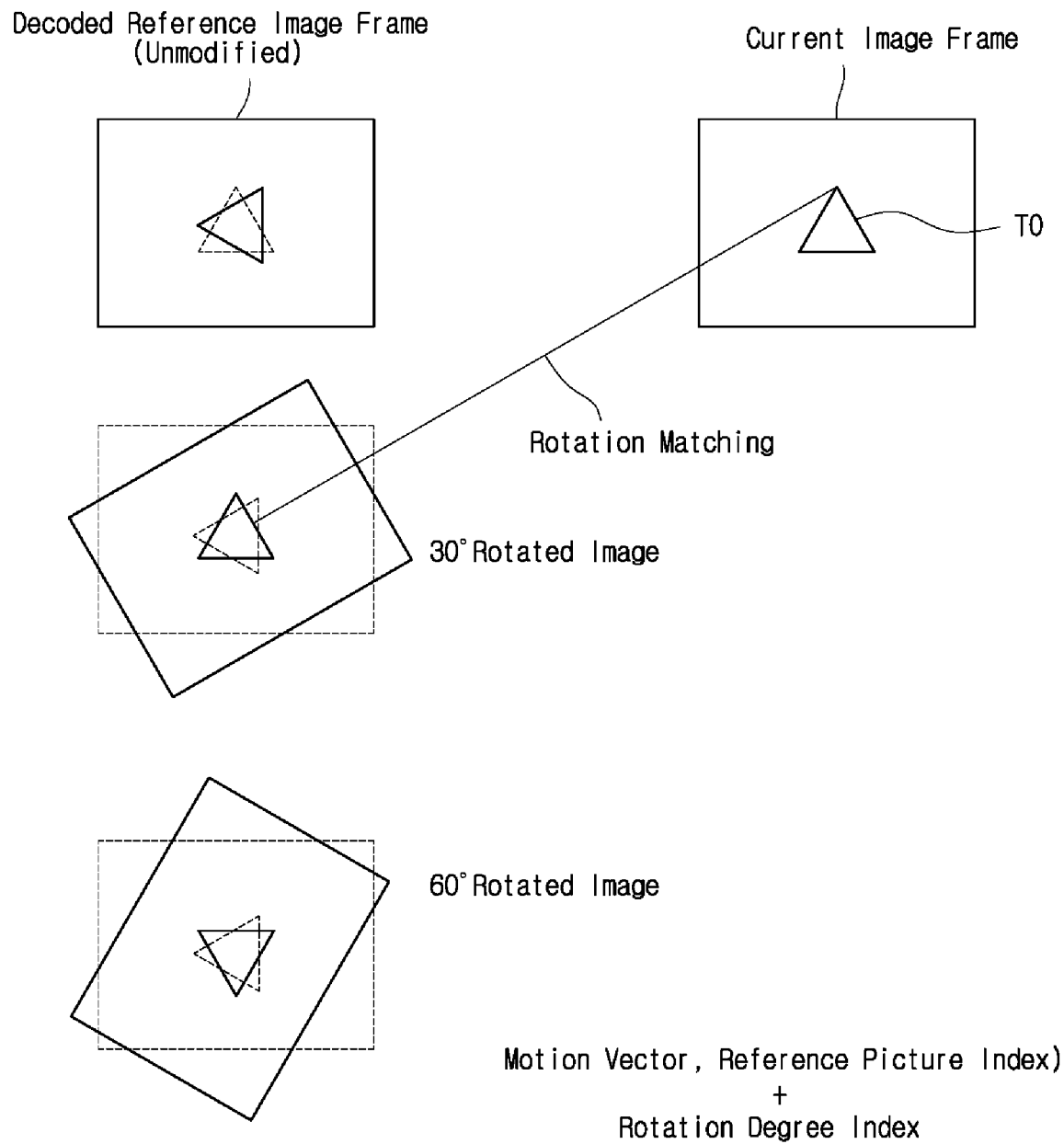
FIG. 9 is a diagram illustrating a modification of a reference image using a rotation parameter, according to one or more example embodiments.

FIG. 9 is a diagram illustrating a modification of a reference image using a rotation parameter, according to one or more example embodiments.

Referring to FIG. 9, a target object TO in a current image frame is rotated in a decoded reference image. If a reference image modification is not considered, coding blocks of the current image frame are predicted from the decoded reference image based on intra-image prediction or inter-image prediction. Since the target object TO is rotated, the compression may not be optimal. According to one or more example embodiments, the decoded reference image may be modified by rotating the decoded reference image, such that the target object TO in a rotated reference image better matches the target object TO in the current image frame.

For instance, in FIG. 9, a rotation degree 30° provides a suitable (e.g., best) matching of the target object TO. The center of rotation may be determined based on the location of the target object TO in the decoded reference image or may be determined as the top-left corner of the decoded reference image (see, e.g., FIG. 10) or other location with respect to the decoded reference image. Extended motion parameters may include a modified motion vector, reference picture index, and a rotation degree index. The rotation degree index may include at least one of the center of rotation and a rotation degree. Among the extended motion parameters, a scaling parameter (e.g., scaling ratio S, $S_1$, and $S_2$), a rotation parameter (e.g., rotation degree, the center of rotation, etc.), and a shear parameter, may be referred to as a reference image modification parameter. However, example embodiments are not limited thereto. As used, herein, the reference image modification parameter may be used to modify a reference image.

Figure 10:
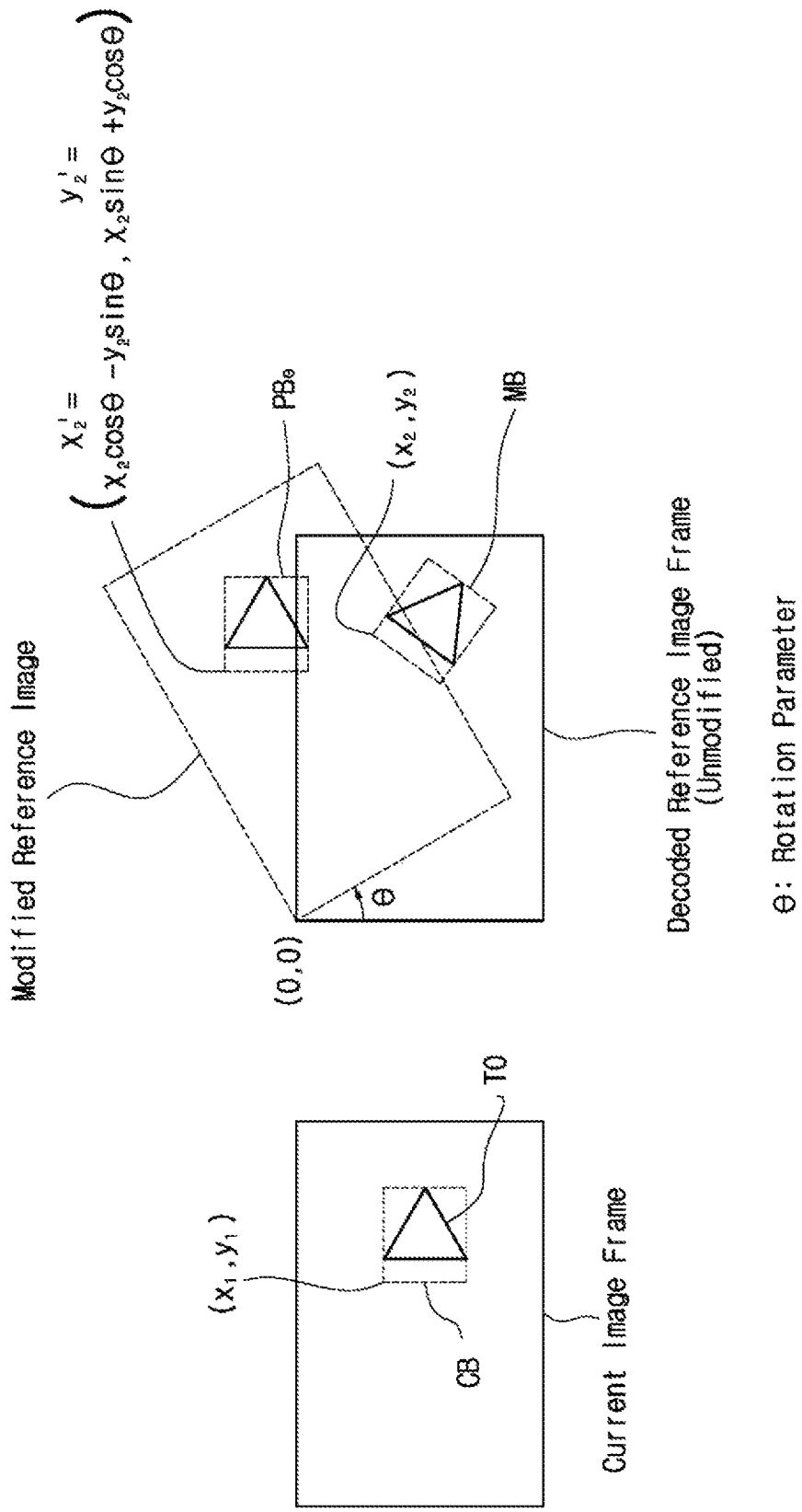
FIG. 10 is a diagram illustrating a modification of a reference image using a rotation parameter, according to one or more example embodiments.

FIG. 10 is a diagram illustrating a modification of a reference image using a rotation parameter, according to one or more example embodiments.

Referring to FIG. 10, the current image frame includes a target object TO. The coordinate of the top-left corner of the current coding block CB of the current image frame is ($x_1$, $y_1$). A corresponding target object TO in a decoded reference image may be rotated by θ degrees, with respect to the target object TO in the current image frame. To enhance inter-image prediction efficiency and/or probability, the decoded reference image may be modified by rotating the decoded reference image by θ degrees.

The prediction block $PB_θ$ in the modified reference image may be used for inter-image prediction of the current coding block CB of the current image frame. Further, the prediction block $PB_θ$ in the modified reference image may be a counter-clockwise rotation of the matching block MB in the decoded reference image. However, the pixels in the matching block MB may not be exactly matched with pixels in the prediction block $PB_θ$. Accordingly, various interpolation schemes may be applied and pixel values may be adjusted. A modified motion vector $MV_θ$ may be determined according to Equation 8.

$$MV_θ = (x_2' - x_1, y_2' - y_1) \quad \text{Eq. 8}$$

where $x_2' = x_2 \cdot \cos θ - y_2 \cdot \sin θ$; $y_2' = x_2 \cdot \sin θ + y_2 \cdot \cos θ$ The rotation parameter θ may be a modification parameter of the decoded reference image. Both the modified motion vector $MV_θ$ and the rotation parameter θ may be extended motion parameters. Further, according to one or more example embodiments, in association with the rotation parameter θ, a modified motion vector $MV_θ$ may be defined according to Equation 9.

$$MV_θ = (x_2 - x_1, y_2 - y_1), \quad \text{Eq. 9}$$

where $x_2 = x_2' \cdot \cos(-θ) - y_2' \cdot \sin(-θ)$, and $$y_2 = x_2' \cdot \sin(-θ) + y_2' \cdot \cos(-θ)$$

Figure 11:
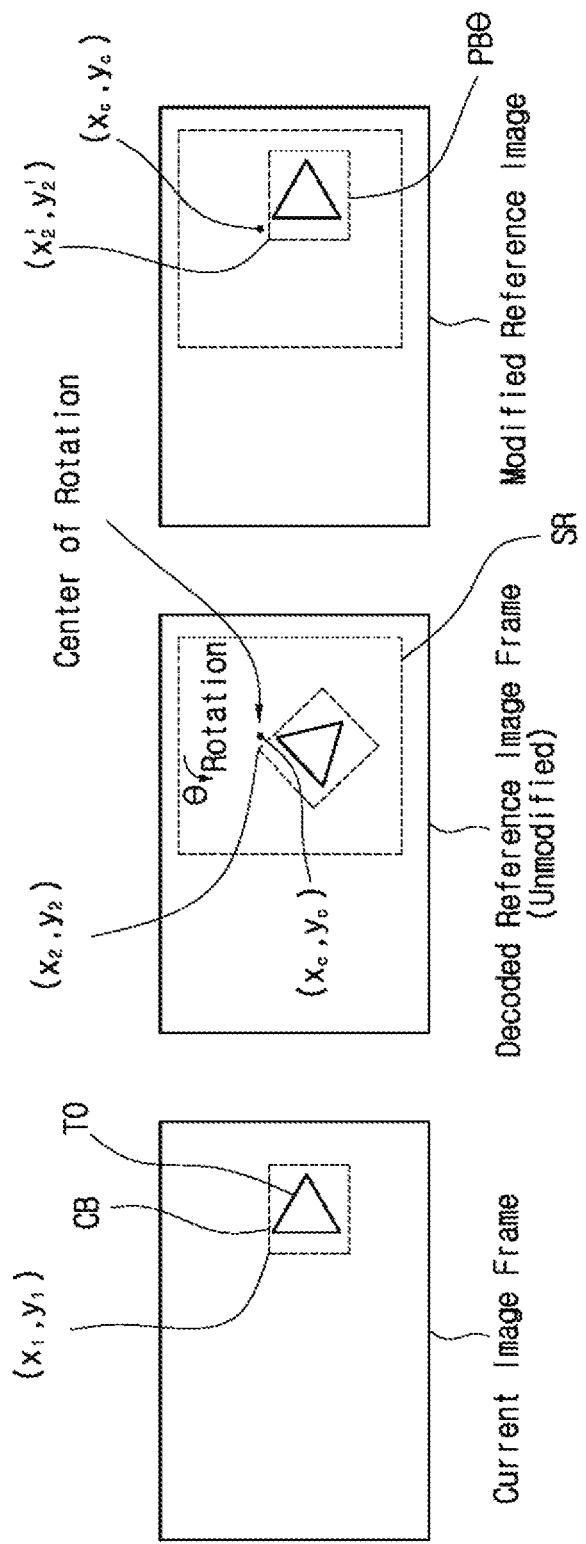
FIG. 11 is a diagram illustrating a modification of a reference image using a rotation parameter, according to one or more example embodiments.

FIG. 11 is a diagram illustrating a modification of a reference image using a rotation parameter, according to one or more example embodiments.

Referring to FIG. 11, a search range SR may be determined in the decoded reference image. The search range may be rotated by θ degrees. The center of the rotation may be the center of the search range SR, as shown in FIG. 11. However, example embodiments are not limited thereto. For instance, the center of the rotation may be the top-left corner of the search range SR. A modified motion vector in association with the size of the search range SR, the center of rotation, and a rotation degree may be defined according to Equation 10.

$$MV_θ = (x_2' - x_1, y_2' - y_1) \quad \text{Eq. 10}$$

where $$x_2' = (x_2 - x_c) \cdot \cos θ - (y_2 - y_c) \cdot \sin θ + x_c; y_2' = (x_2 - x_c) \cdot \sin θ + (y_2 - y_c) \cdot \cos θ + y_c$$

The center of rotation ($x_c$, $y_c$) and rotation parameter θ may be a modification parameters of the decoded reference image. Further, the modified motion vector $MV_0$, the center of rotation ($x_c$, $y_c$), and the rotation parameter θ may be extended motion parameters. Further, according to one or more example embodiments, in association with the center of rotation ($x_c$, $y_c$) and the rotation parameter θ, a modified motion vector $MV_θ$ may be defined according to Equation 11.

$$MV_θ = (x_2 - y_1, y_2 - y_1) \quad \text{Eq. 11}$$

where $x_2 = (x_2' - x_c) \cdot \cos(-θ) - (y_2' - y_c) \cdot \sin(-θ) + x_c$, and $$y_2 = (x_2' - x_c) \cdot \sin(-θ) + (y_2' - y_c) \cdot \cos(-θ) + y_c$$

Figure 12:
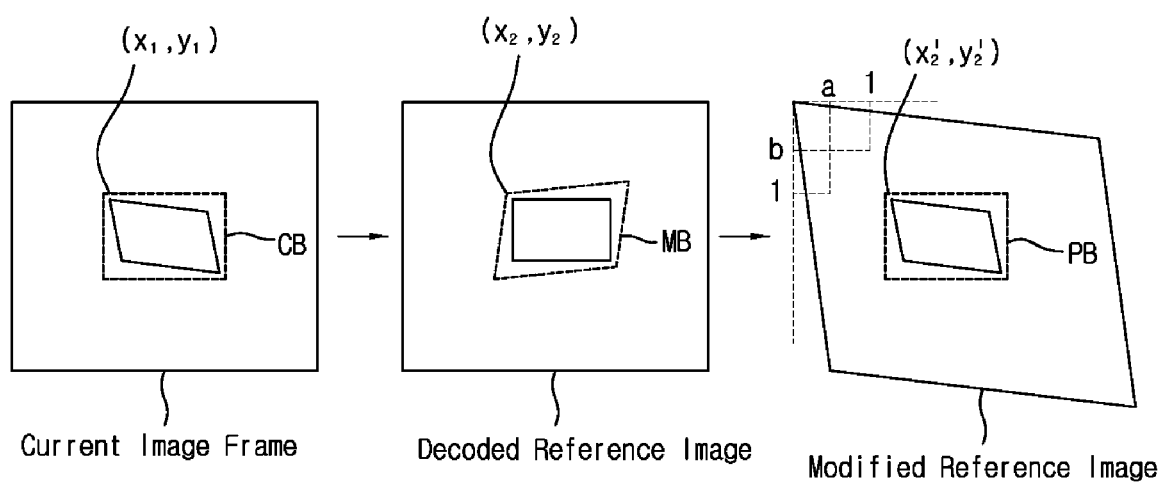
FIG. 12 is a diagram illustrating a modification of a reference image using a shear parameter, according to one or more example embodiments.

FIG. 12 is a diagram illustrating a modification of a reference image using a shear parameter, according to one or more example embodiments.

Referring to FIG. 12, the current image frame includes a target object TO, which is a shear image of a corresponding target object in a decoded reference image. The coordinate of the top-left corner of the current coding block CB of the current image frame is ($x_1$, $y_1$). The corresponding target object TO in a decoded reference image may be sheared to enhance inter-image prediction efficiency and/or probability using Equation 12.

$$\begin{pmatrix} x_2' \\ y_2' \end{pmatrix} = \begin{bmatrix} 1 & a \\ b & 1 \end{bmatrix} \begin{pmatrix} x_2 \\ y_2 \end{pmatrix} \quad \text{Eq. 12}$$

The decoded reference image may be modified by the shearing parameters a and b, which are real numbers. The prediction block PB in the modified reference image may be used for inter-image prediction of the current coding block CB of the current image frame. Also, the prediction block PB in the modified reference image may be a sheared block of the matching block MB in the decoded reference image. However, the pixels in the matching block MB may not be exactly matched with pixels in the prediction block PB if at least one of a and b is not an integer. Accordingly, various interpolation schemes may be applied and pixel values may be adjusted. A modified motion vector MV may be determined according to Equation 13.

$$MV = (x_2' - x_1, y_2' - y_1), \quad \text{Eq. 13}$$

where $x_2' = x_2 + y_2 \cdot a$, $y_2' = x_2 \cdot b + y_2$

The shear parameters a and b may be a modification parameter of the decoded reference image. Both the modified motion vector MV and the rotation parameters a and b may be extended motion parameters. Further, according to one or more example embodiments, in association with the shear parameters a and b, a modified motion vector MV may be determined according to Equation 14.

$$MV = (x_2 - x_1, y_2 - y_1), \quad \text{Eq. 14}$$

where $x_2 = (x_2' - a \cdot y_2')/(1 - a \cdot b)$, and $y_2 = (y_2' - b \cdot x_2')/(1 - a \cdot b)$ In the above equations, if $(x_2 - x_1, y_2 - y_1)$ is used as a motion vector, modified reference image may be stored in a picture buffer relatively short amount of time. Instead, the corresponding unmodified reference image may be maintained in the picture buffer and the reference image may be modified based on a modification parameter and inter-prediction may be performed based on the modified reference image.

Hereinafter, examples of reference list syntax will be described.

Parameter sets may have a structure similar to HEVC and H.264/AVC with some modifications and extensions. For example, Sequence Parameter Set (SPS) and Picture Parameter Set (PPS) may be configured or otherwise utilized. Further, Video Parameter Set (VPS) may also be added. Each picture (or image frame) may have one or more slices and each slice may reference a single active PPS, SPS, and VPS to access information used for decoding the slice. The PPS may include information applicable to all slices in a picture. The slices in different pictures may also be configured to refer to the same PPS. The SPS may include information applicable to all pictures in the same coded video sequence. The VPS may include information applicable to all layers within a coded video sequence. The VPS may be used for layered extensions, such as scalable and multi-view coding.

Each slice header may include a PPS identifier, which references a particular PPS. The PPS may include an SPS identifier that references a particular SPS. The SPS may include an identifier that references a particular VPS. The PPS may include parameters that may change for different pictures within the same coded video sequence. However, multiple pictures may refer to the same PPS, according to one or more example embodiments. Each PPS may include a PPS identifier, an index to a reference SPS, and other parameters describing coding tools used in the slices, which refer to the PPS. Coding tools may be weighted predicted, reference list modified, etc. Further, coding tool parameters signaled in the PPS may include the number of reference indices.

According to one or more example embodiments, the PPS may include various parameters described below. The names of the parameters may be changed according to various configurations. Further, the parameters or associated parameters may be included in another parameter set or slice header.

The parameter ref_lod_enable_flag may indicate whether a scaled LOD image of the corresponding picture is generated for inter-image prediction.

The parameter lod_scaling_ratio_flag may indicate whether the scaling of the reference image is performed by using a default scaling value, such as S=½ or 2. For example, if lod_scaling_ratio_flag=0, the scaling of the reference image may be performed using a default scaling value S=½ or S=2. If lod_scaling_ratio_flag=1, the scaling of the reference image may be performed using a non-default scaling value, such as S=¾.

Further, lod_scaling_mantissa and lod_scaling_exponent may be defined. As an example, a non-default scaling value $S = m \cdot 2^n$, with lod_scaling_mantissa=m and lod_scaling_exponent=n, may be utilized.

The parameter lod_start_num may indicate the LOD index of an LOD having the largest LOD size. For example, if lod_start_num=−2, the largest LOD is LOD-2, which is resized based on a scaling ratio S=4. If lod_start_num=0, the largest LOD is the unmodified reference image corresponding to $LOD_0$.

The parameter lod_end_num may indicate the LOD index of an LOD having the smallest LOD size. For example, if lod_end_num=2, $LOD_1$ and $LOD_2$ may be generated from the decoded reference image $LOD_0$.

The parameter lod_scaling_filter_type may indicate a filter type for interpolation. For example, a nearest neighbor filter type may be indicated by lod_scaling_filter_type=0, a bilinear filter type may be indicated by lod_scaling_filter_type=1, and a bicubic filter type may be indicated by lod_scaling_filter_type=2.

The parameter ref_rot_enable_flag may indicate whether a rotated reference image is generated for inter-image prediction.

The parameter rot_center_flag may indicate whether the center of rotation of the reference image is performed using a default value, such as the top-left corner of a reference image. For example, if rot_center_flag=0, the rotation of the reference image is performed by using a default center of rotation value (0, 0), as shown in FIG. 10. If rot_center_flag=1, the center of rotation is indicated using a non-default value, such as C=(Xc, Yc), which is the coordinate of the center of rotation.

The parameter rot_range_flag may indicate whether the entire area of the reference image is rotated. For example, if rot_range_flag=0, the rotation of the reference image is performed by rotating the entire reference image, as shown in FIG. 10. If rot_range_flag=1, the rotation area in the reference image may be additionally informed, as shown in FIG. 11.

The parameter rot_angle may indicate the rotation degree θ.

The parameter rot_scaling_filter_type may indicate a filter type for interpolation. For example, a nearest neighbor filter type may be indicated by rot_scaling_filter_type=0, a bilinear filter type may be indicated by rot_scaling_filter_type=1, and a bicubic filter type may be indicated by rot_scaling_filter_type=2.

The parameter ref_shear_enable_flag may indicate whether a sheared reference image is generated for inter-image prediction.

The parameter shear_range_flag may indicate whether the entire area of the reference image is modified as a sheared reference image. For example, if shear_range_flag=0, the entire area of the reference image is modified, as shown in FIG. 12. If shear_range_flag=1, the shear processing area in the reference image may be additionally informed.

The parameter shear_a_component may indicate the value a in the matrix of Equation 12.

The parameter shear_b_component may indicate the value b in the matrix of Equation 12.

The parameter shear_scaling_filter_type may indicate a filter type for interpolation. For example, a nearest neighbor filter type may be indicated by shear_scaling_filter_type=0, a bilinear filter type may be indicated by shear_scaling_filter_type=1, and a bicubic filter type may be indicated by shear_scaling_filter_type=2.

With regard to slice syntax, a slice of a current picture may include a slice segment and each slice segment may include a slice segment header. The slice segment header may include an index to a reference PPS and data identifying the slice segment. Optional extra slice segment header bits may be included at the beginning of the slice segment header, when indicated in the associated PPS. The optional extra slice segment header bits may be used to utilize the extended parameters while maintaining backward compatibility with existing parameters of HEVC or its predecessors.

According to one or more example embodiments, a slice header may include lod_referencing_enable, rot_referencing_enable, and shear_referencing_enable.

The parameter lod_referencing_enable may indicate the current slice uses a LOD reference image for inter-image prediction.

The parameter rot_referencing_enable may indicate the current slice uses a rotated reference image for inter-image prediction.

The parameter shear_referencing_enable parameter indicate the current slice uses a sheared reference image for inter-image prediction.

A prediction unit (PU) may determine a modified reference image by an identifier if the referencing of the modified reference image is enabled and the modified reference image is available.

Referring to FIG. 5, the modification controller 540 may provide a general affine matrix defined by Equation 15 by controlling the spatial scaler 510, the image rotation controller 520, and the image shear controller 530.

$$\begin{bmatrix} x' \\ y' \\ 1 \end{bmatrix} = \begin{bmatrix} c & d & e \\ f & g & h \\ 0 & 0 & 1 \end{bmatrix} \begin{bmatrix} x \\ y \\ 1 \end{bmatrix}, \text{ where}$$ Eq. 15

$$\begin{bmatrix} c & d & e \\ f & g & h \\ 0 & 0 & 1 \end{bmatrix} = \begin{bmatrix} 1 & a & 0 \\ b & 1 & 0 \\ 0 & 0 & 1 \end{bmatrix} \cdot \begin{bmatrix} \cos\theta & -\sin\theta & 0 \\ \sin\theta & \cos\theta & 0 \\ 0 & 0 & 1 \end{bmatrix} \cdot \begin{bmatrix} S1 & 0 & 0 \\ 0 & S2 & 0 \\ 0 & 0 & 1 \end{bmatrix} \cdot \begin{bmatrix} x \\ y \\ 1 \end{bmatrix}$$

The matrix $$\begin{bmatrix} S1 & 0 & 0 \\ 0 & S2 & 0 \\ 0 & 0 & 1 \end{bmatrix}$$

may be a spatial scaling and spatial movement matrix configured in the spatial scaler 510. S1 denotes a width scale ratio and S2 denotes a height scale ratio.

The matrix $$\begin{bmatrix} \cos\theta & -\sin\theta & 0 \\ \sin\theta & \cos\theta & 0 \\ 0 & 0 & 1 \end{bmatrix}$$

may be a rotation matrix configured in the image rotation controller 520, where $\theta$ denotes a rotation degree.

The matrix $$\begin{bmatrix} 1 & a & 0 \\ b & 1 & 0 \\ 0 & 0 & 1 \end{bmatrix}$$

may be a shear matrix configured in the image shear controller 530, where the parameters a and b denote shear parameters.

The PPS or a slice header may include geometric_transform_enable_flag, which enables geometric transform of a decoded reference image. If the geometric_transform_enable_flag is enabled, the geometric parameters c, d, e, f, g, and h of the general affine matrix may be provided.

A picture buffer, e.g., the picture buffers 390 and 450, may be a buffer that stores decoded reference image frames (unmodified) and modified reference images. As an example, the minimum buffer size that a decoder allocates for decoding a particular bitstream may be signaled by a parameter, which may be set for each temporal sub-layer in the sequence parameter set. Further, the minimum buffer size for decoded reference image frames may be indicated by e.g., sps_max_dec_pic_buffering_minus1 codeword, and the minimum buffer size for modified reference images may be indicated by another parameter. In addition, maximum buffer size may also be determined as a fixed value or indicated by a parameter.

Both the unmodified reference image frames and modified reference images may be used as reference images for inter-image prediction. The modified reference images are not displayed. Thus, the modified reference images may be categorized as "used for short-term reference" (type 1) and "used for long-term reference" (type 2). The decoded reference image frames may be further categorized as "unused for reference" (type 3) in addition to the aforementioned type 1 and type 2 because a type 3 reference image is displayed later.

Similar to HEVC, type 2 picture may be maintained in the picture buffer longer than type 1 picture. The modified reference images categorized as type 1 may be changed to type 2 or may be removed from the picture buffer. The modified reference images categorized as type 2 may be removed from the picture buffer if they will not be used as reference images.

In HEVC, reference picture set (RPS) may refer to a set of picture indicators that is signaled in each slice header and consists of one set of short-term pictures and one set of long-term pictures. After the first slice header of a picture has been decoded, the pictures in a decoded picture buffer may be marked as specified by the RPS. All pictures that have been decoded that may be used as reference images for prediction of any subsequent pictures in decoding order are included in the RPS. An RPS includes a set of POC values that are used for identifying the pictures in the decoded picture buffer. RPS also signals an availability flag for each picture to indicate whether the corresponding picture is available or unavailable for reference for the current picture ("current image frame" or "current image"). Unavailable pictures may be made available for reference later on and used for decoding future pictures.

According to one or more example embodiments, the RPS may be a set of unmodified and modified reference image indicators that is signaled in each slice header and include one set of short-term reference images (both unmodified and modified) and one set of long-term reference images (both unmodified and modified). After the first slice header of a picture has been decoded, the reference images in a picture buffer may be marked as specified by the RPS. An RPS may include a set of POC values that are used for identifying the unmodified pictures in the decoded picture buffer and a set of modification identifiers. Each of the modification identifiers is associated with a POC value. For example, the modification identifiers may include at least one of a flag and an index to identify a modified reference image in the picture buffer.

Further, the modification identifiers may include a parameter corresponding to (or associated with) at least one of the extended motion parameters, reference image modification parameters, and flags relating to a modification of reference image previously described. An RPS may signal an availability flag for each reference image (both unmodified and modified) to indicate whether the corresponding reference image is available or unavailable for reference for the current picture ("current image frame" or "current image"). Unavailable reference images may be made available for reference later on and used for decoding future pictures.

For inter-image prediction for a block of a current image frame, a corresponding modified reference image may be retrieved from the picture buffer 390 and/or 450. The modified reference image may be generated after the reconstruction of the reference image from which the modified reference image has originated. According to another configuration, the picture buffer 390 and/or 450 may not store some modified reference images, but may generate them later based on their unmodified reference images and extended motion parameters including reference image modification parameters.

According to one or more example embodiments, modified reference images of "used for long-term reference" (type 2) may not be stored in the picture buffer 390 and/or 450, but may be generated later based on their unmodified reference images kept in the picture buffer 390 and/or 450 and extended motion parameters including reference image modification parameters. Accordingly, picture buffer size can be reduced.

When motion estimation is performed by the motion estimator 320, the motion estimator 320 may receive information regarding at least one target object TO included in a current image frame. The information regarding at least one target object TO may include the boundaries of the target object TO, the location of the target object TO, three dimensional motion information of the target object TO, etc. Based on the information regarding at least one target object TO, motion estimation might be more efficiently performed and the number of modified reference image to be generated may be reduced.

Figure 13:
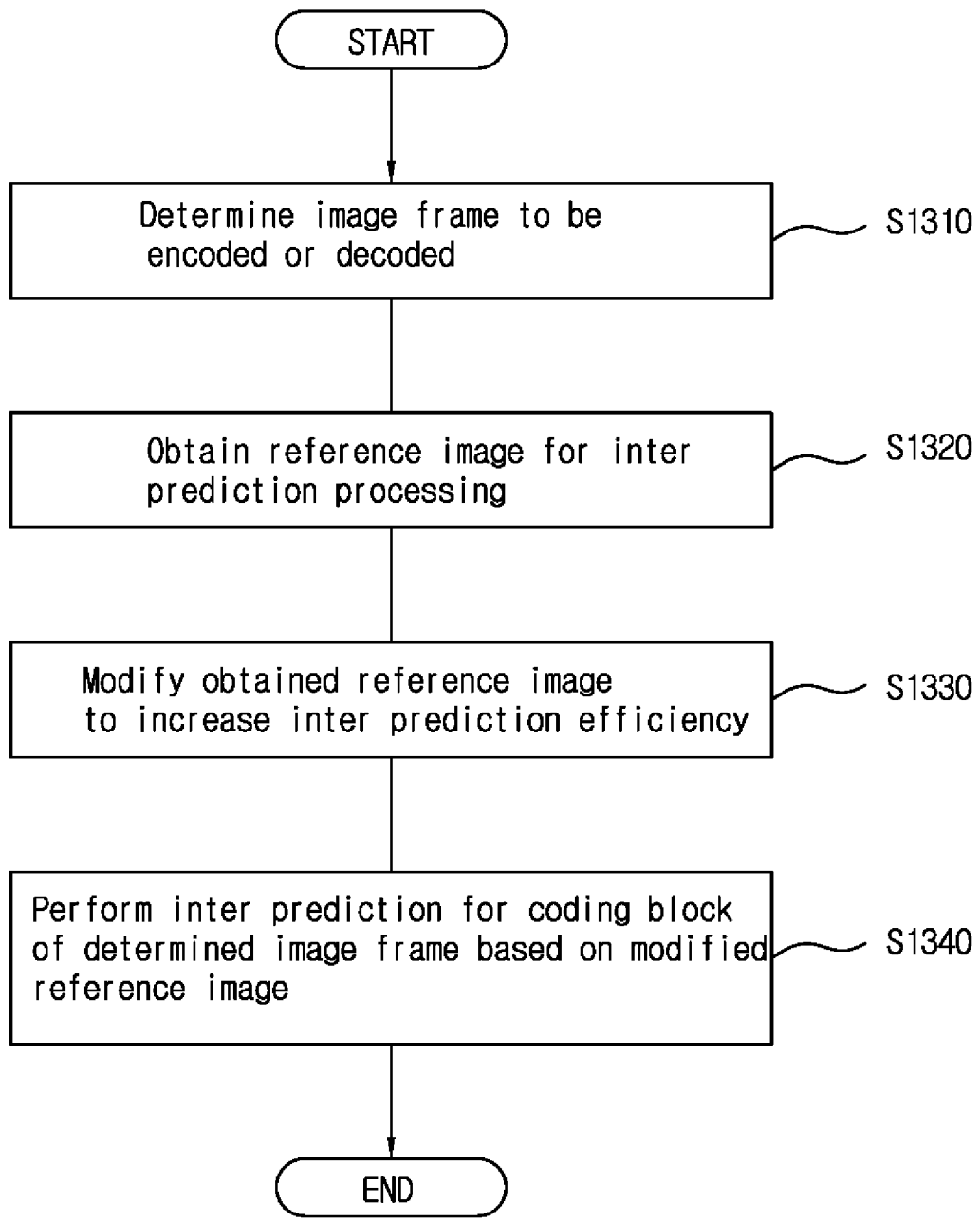
FIG. 13 is a flowchart illustrating a process of modifying a reference image for inter-prediction, according to one or more example embodiments.

FIG. 13 is a flowchart illustrating a process of modifying a reference image for inter-prediction, according to one or more example embodiments.

In operation S1310, a video coder may determine an image frame to be encoded or decoded. The determined image frame may serve as a current image frame. For example, a video encoder may determine a coding block of a current image frame to be encoded, and a video decoder may determine a coding block of a current image frame to be decoded. For a coding block of a current image frame, an inter-prediction or an intra-prediction is determined. If the inter-prediction is determined for a coding block of a current image frame, an inter-predictor, e.g., the inter-predictor including the motion estimator 320 and the motion compensator 330 of FIG. 3, or the inter-predictor including the motion compensator 460 of FIG. 4, may be utilized. In this manner, a decoded picture pre-processor may utilize a modified reference image stored in a picture buffer.

At operation S1320, the video coder may obtain a reference image for inter-prediction processing. The reference image is a previously decoded reference image frame temporally different from the current image frame. The video coder may modify the obtained reference image to enhance inter-prediction efficiency, per operation S1330. The modified reference image may be generated by modifying the reference image. In operation S1340, the video coder may perform an inter-prediction for a coding block of the determined image frame based on the modified reference image.

Figure 14:
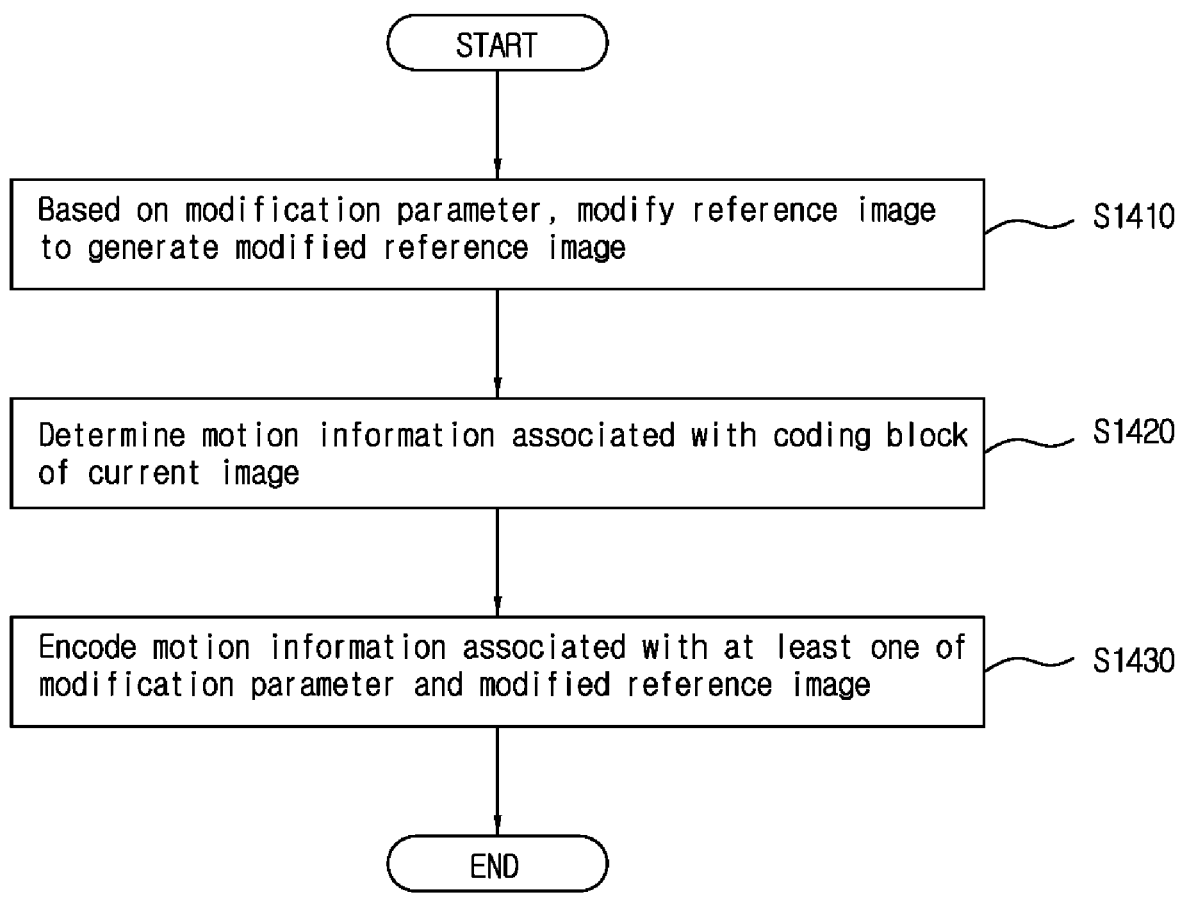
FIG. 14 is a flowchart illustrating a process of a video encoder to modify a reference image for inter-prediction, according to one or more example embodiments.

FIG. 14 is a flowchart illustrating a process of a video encoder to modify a reference image for inter-prediction, according to one or more example embodiments.

In operation S1410, the video encoder may modify, based on a modification parameter, a reference image to generate a modified reference image. The modification parameter may include one or more parameters for modifying a reference image, e.g., the scaling parameter, the rotation parameter, and the shear parameter. For instance, the modified reference image may include at least one modified object, and the modified object may be modified based on at least one of the scaling parameter, the rotation parameter, and the shear parameter.

At operation S1420, the video encoder may determine motion information associated with a coding block of a current image. The video encoder may encode the motion information associated with at least one of the modification parameter and the modified reference image, per operation S1430. For example, the motion information may include a motion vector associated with the coding block of the current image and a prediction block of the modified reference image. The motion information may be associated with the coding block of the current image and a matching block of the reference image. The motion information may further include information about the modification parameter. The matching block of the reference image may be transformed into the prediction block of the modified reference image by the reference image modification process.

Figure 15:
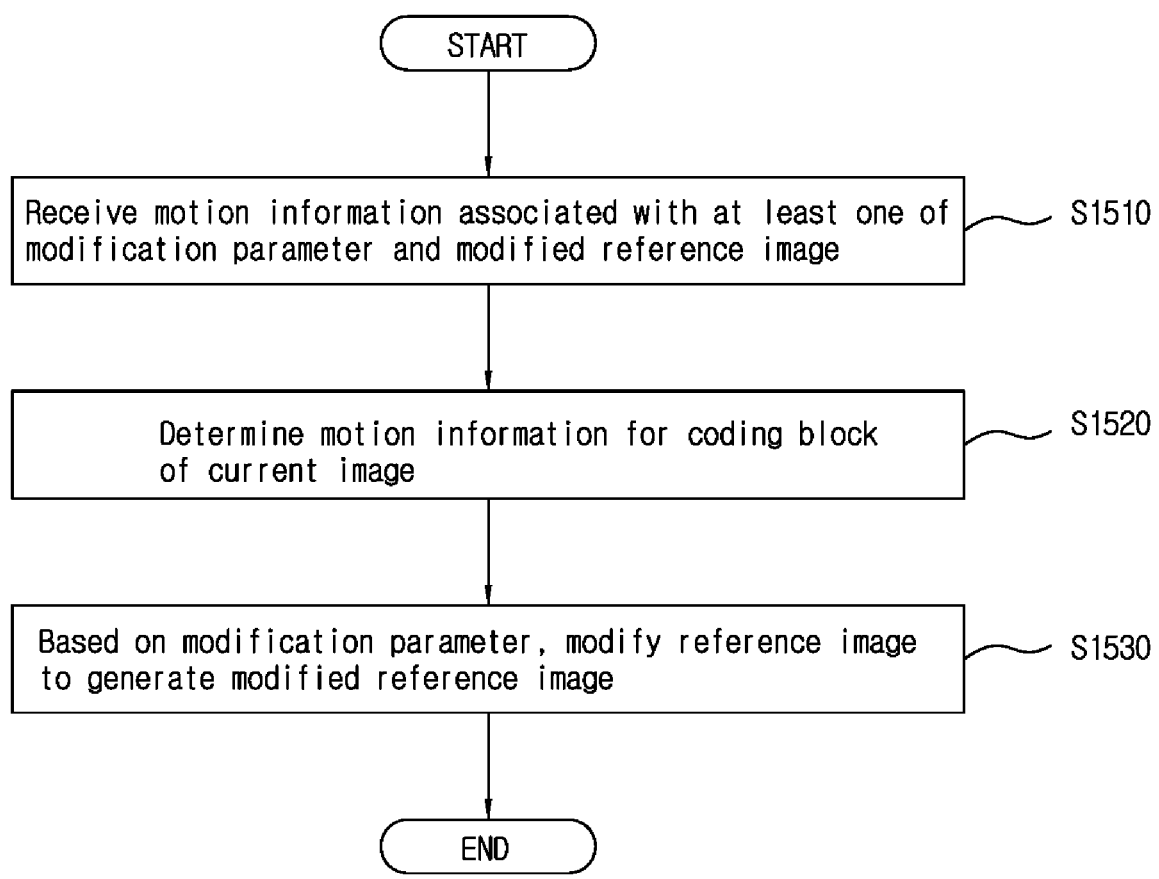
FIG. 15 is a flowchart illustrating a process of a video decoder to modify a reference image for inter-prediction, according to one or more example embodiments.

FIG. 15 is a flowchart illustrating a process of a video decoder to modify a reference image for inter-prediction, according to one or more example embodiments.

In operation S1510, the video decoder may receive motion information associated with at least one of a modification parameter and a modified reference image. At least part of the motion information may be transmitted from a video encoder, e.g., the video encoder illustrated with reference to FIGS. 3 and 14. The syntax of the motion information transmitted from the video encoder may be predefined between the video encoder and the video decoder.

At operation S1520, the video decoder may determine motion information for a coding block of a current image. The video decoder may modify, based on a modification parameter included in the motion information for the coding block of the current image, a reference image to generate a modified reference image, per operation S1530. The modification parameter may include parameters for modifying a reference image, e.g., the scaling parameter, the rotation parameter, and the shear parameter. For example, the modified reference image may include at least one modified object, and the modified object may be modified based on at least one of the scaling parameter, the rotation parameter, and the shear parameter.

According to one or more example embodiments, the motion information for the coding block of the current image may include a motion vector associated with the coding block of the current image and a prediction block of the modified reference image. The motion information may be associated with the coding block of the current image and a matching block of the reference image. The motion information may further include information about the modification parameter. The matching block of the reference image may be transformed into the prediction block of the modified reference image by the reference image modification process.

Figure 16:
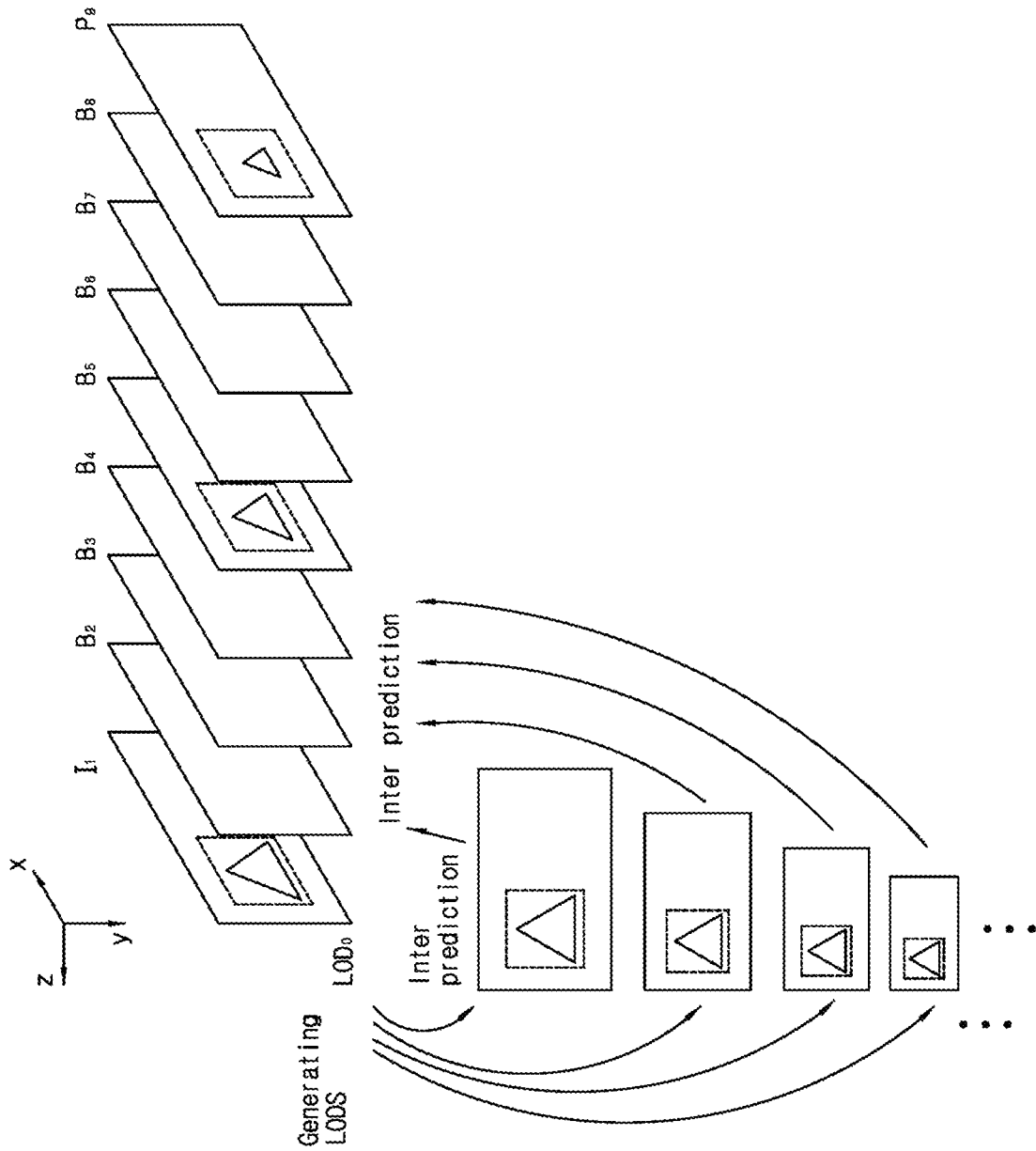
FIGS. 16 and 17 illustrate respective inter-predictions using generated LODs, according to one or more example embodiments.
Figure 17:
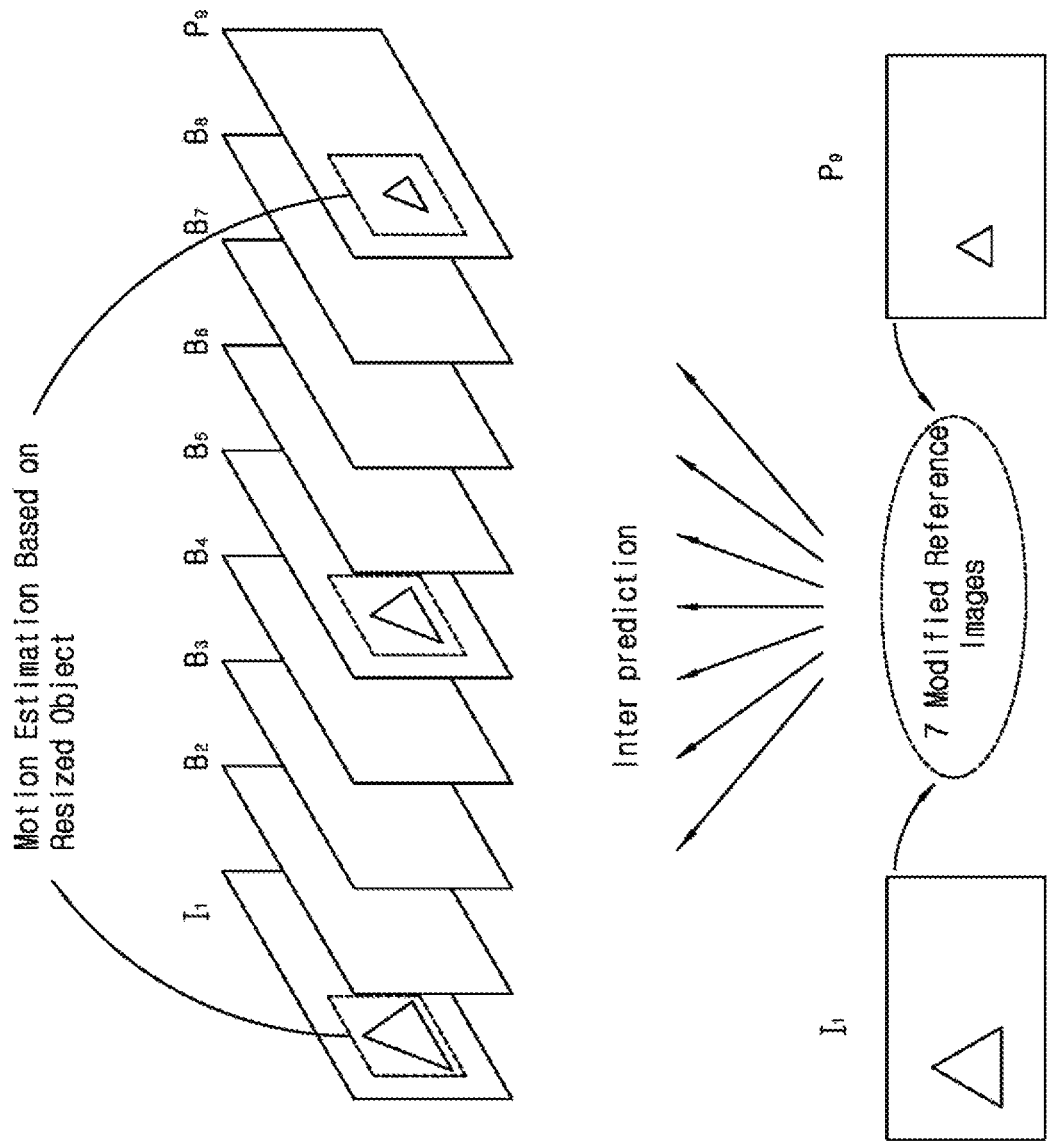

FIGS. 16 and 17 respectively illustrate inter-predictions using generated LODs, according to one or more example embodiments.

Referring to FIG. 16, a set of pictures, e.g., $I_1$, $B_2$, $B_3$, $B_4$, $P_5$, $B_6$, $B_7$, $B_8$, and $P_9$, may be analyzed and a z-directional motion of an object may be determined. In HEVC, there are three slice types: The intra (I) slice for which only intra prediction is allowed. The predictive (P) slice which in addition to intra prediction also allows inter prediction from one reference picture per block using one motion vector and one reference index. Bi-predictive (B) slice which in addition to intra and uni-prediction also allows inter prediction using two motion vectors and two reference indices. According to one or more example embodiments, since modified reference images may also be used, a flag may be used for each slice to indicate whether a modified reference image is used for inter prediction for the slice. Picture $I_1$ may be determined as a reference image and modified reference images may be generated by changing LODs of the picture $I_1$. The size of the object, e.g., the object of the triangular shape, in each picture may gradually decrease as the sequence of the image frames moves from picture $I_1$ to picture $P_9$. In this manner, the LODs may be generated such that the sizes of the object gradually decreases. A coding block including the object may further include motion information, which indicates motion of the object along the z-direction.

Referring to FIG. 17, the pictures $I_1$ and $P_9$ may be used to generate modified reference images for inter-prediction of seven image frames between the pictures $I_1$ and $P_9$. An interpolation may be performed to generate seven modified reference images.

Figure 18:
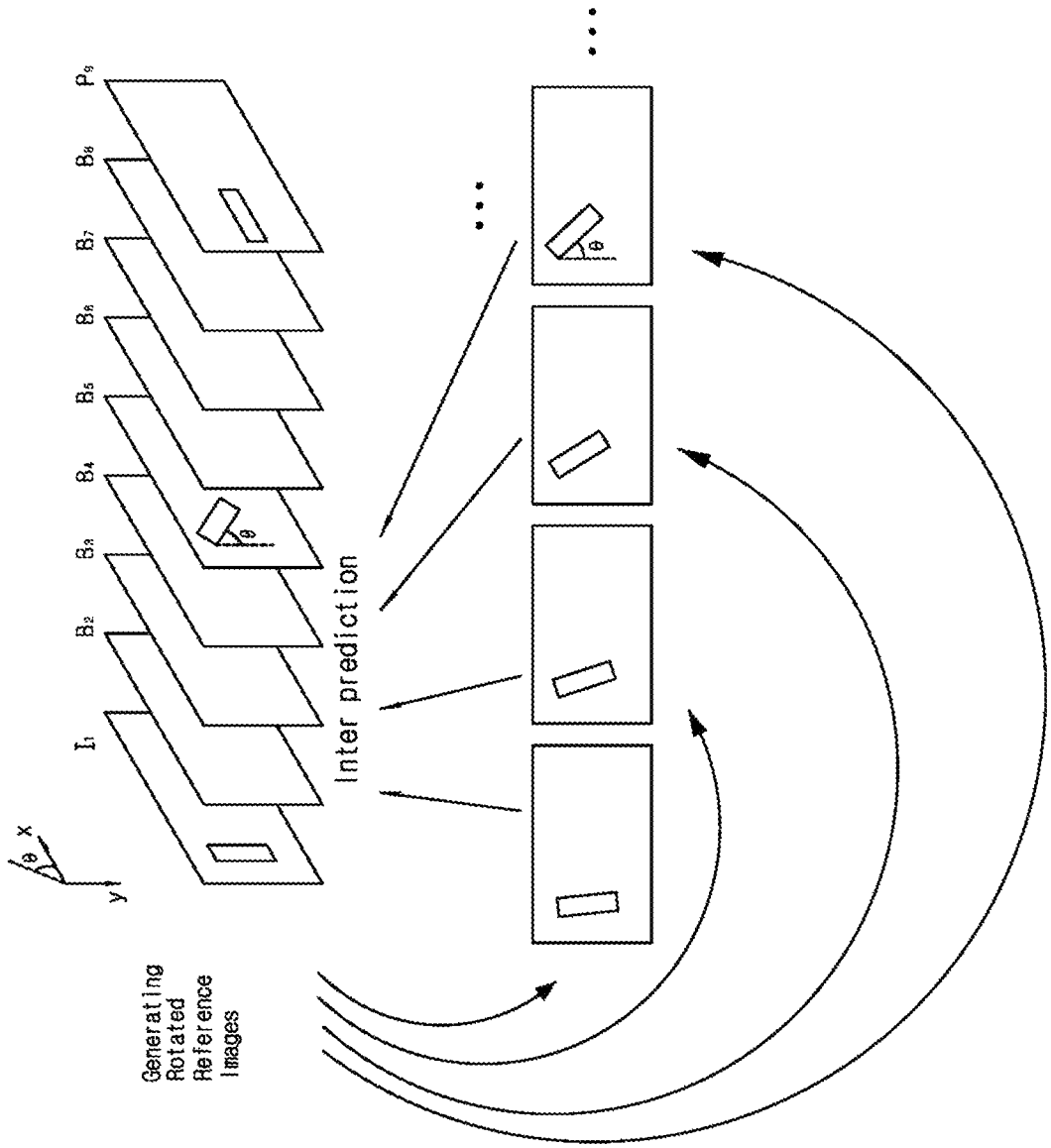
FIG. 18 illustrates inter-prediction using generated rotated reference images, according to one or more example embodiments.

FIG. 18 illustrates an inter prediction using generated rotated reference images, according to one or more example embodiments.

Referring to FIG. 18, a set of pictures, e.g., pictures $I_1$, $B_2$, $B_3$, $B_4$, $P_5$, $B_6$, $B_7$, $B_8$, $P_9$, may be analyzed and a rotational motion of an object may be determined. Picture $I_1$ may be determined as a reference image and modified reference images may be generated by rotating at least part of the picture $I_1$. The tilt of the object, e.g., the object of the rectangular shape, in each picture may gradually change as the sequence of the image frames moves from picture $I_1$ to picture $P_9$. In this manner, the rotated reference images may be generated such that the tilt of the object gradually changes. A coding block including the object may further include motion information, which indicates a rotational degree of the object.

Reference Picture Sets

In HEVC, the process of marking pictures as "used for short-term reference," "used for long-term reference," or "unused for reference" is executed using a reference picture set (RPS). An RPS is a set of picture indicators that is signaled in each slice header and consists of one set of short-term pictures and one set of long-term pictures. Once the first slice header of a picture is decoded, the pictures in the decoded picture buffer are marked as specified by the RPS. An RPS includes a set of picture order count values that are used to identify the pictures in the DPB. Besides signaling POC information, the RPS also signals one flag for each picture. Each flag indicates whether the corresponding picture is available or unavailable for reference for the current picture.

According to one or more example embodiments, for a modified reference image, a POC value of the associated reference image from which the modified reference image is generated and a modification parameter to modify the associated reference image to generate the modified reference image may be used in the RPS to identify the modified reference image. If a unique index or a unique identifier is assigned for each modified reference image the unique index or identifier may be used.

Reference Picture Lists

In HEVC, a particular set of previously decoded pictures is present in a decoded picture buffer (DPB) for the decoding of the remainder of the pictures in the bitstream. To identify these reference pictures, a list of picture order count (POC) identifiers is transmitted in each slice header. The set of retained reference pictures is the reference picture set (RPS). In HEVC, two lists, reference picture list 0 and reference picture list 1, are constructed as lists of pictures in the DPB. An index (called a reference picture index) is used to identify a particular picture in one of these lists. For uni-prediction, a picture may be selected from either one of the two lists. For biprediction, two pictures may be selected—one from each list. When a list contains only one picture, the reference picture index implicitly has the value 0 and does not need to be transmitted in the bitstream.

According to one or more example embodiments, an index identifying a modified reference image may be included in the reference picture list 0 or reference picture list 1. Further, another reference picture list, e.g., reference picture list 2, reference picture list 3, etc., may be used to include indexes of modified reference images. If the reference picture lists have additional reference picture list(s) other than the reference picture list 0 or reference picture list 1, the additional reference picture list(s) may be designated for modified reference images, and the reference picture list 0 and reference picture list 1 may be used to include POCs of unmodified reference images.

According to one or more example embodiments, reference picture list 2 may be used to include a POC of a first reference image (unmodified) and a scaling parameter, e.g., an LOD index, to modify the first reference image. Reference picture list 3 may be used to include a POC of a second reference image (unmodified) and a rotation parameter, e.g., a rotation degree, to modify the second reference image. Reference picture list 4 may be used to include a POC of a third reference image (unmodified) and a shear parameter to modify the third reference image. In such a configuration, reference picture lists 2, 3, 4, . . . , N are designated for different modification types. Each modified reference image does not need to have an index for identifying itself. Instead, a POC of an unmodified reference image and a modification parameter may be used. For example, if both reference picture lists 2 and 3 include POC values and corresponding modification parameters, both scaling and rotation may be performed to generate a modified reference image(s) for inter-prediction of a coding block of a current image frame based on the reference picture list 2 and the reference picture list 3, respectively.

According to one or more example embodiments, inter-image prediction efficiency and/or inter-image prediction probability may increase using a modified reference image.

Although certain example embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. An application processor (AP), comprising:
a processor configured to operate an operating system, the processor comprising a plurality of central processing units;
a video coder configured to determine a prediction mode for a coding block of a current image between an intra-prediction mode and an inter-prediction mode, the video coder comprising an intra predictor and an inter predictor;
a memory configured to store a reference image, the current image and the reference image being temporally different; and
a graphic processing unit (GPU),
wherein the video coder is configured to determine, in the inter-prediction mode, a modification parameter to modify a reference image, the modification parameter comprising a scaling parameter, a rotation parameter, and a shearing parameter, and to generate a modified reference image via rotation, based on the rotation parameter, of at least a portion of the reference image, via change, based on the scaling parameter, of at least one of a level of detail (LOD) and a size of the reference image, and via shearing, based on the shearing parameter, of at least a portion of the reference image,
wherein the inter predictor of the video coder is configured to determine motion information associated with the coding block of the current image and a prediction block of the modified reference image, the motion information being configured to enable a determination of a residual value between the coding block of the current image and the prediction block of the modified reference image, and
wherein the inter predictor of the video coder is configured to determine a motion vector based on a coordinate of the prediction block associated with the modified image object and a coordinate of the coding block of the current image, the coding block of the current image being associated with a zoomed image object matched with the modified image object, and wherein the motion vector is further determined based on a scaling ratio associated with the modification of the reference image.

2. The AP of claim 1, wherein:
the reference image comprises a first reference image and a second reference image;
the rotated portion of the reference image comprises a modification of an object in the first reference image, the modification being based on the rotation parameter; and
a modification of the second reference image comprises at least one of a modified LOD and a modified size of an object in the second reference image, the modified LOD and the modified size being based on the scaling parameter.

3. The AP of claim 1, wherein:
an object in the sheared reference image comprises a shear of the at least a portion of the reference image.

4. A mobile terminal, comprising:
a system-on-chip comprising a processor configured to operate an operating system, a video coder, a memory to store a reference image, and a graphic processing unit (GPU);
a network interface configured to communicate with another electronic device; and
a display,
wherein the video coder is configured to cause the mobile terminal to:
determine a modification parameter to modify a reference image, the modification parameter comprising a scaling parameter, a rotation parameter, and a shearing parameter;
modify, based on a modification parameter, the reference image to generate a modified reference image via rotation, based on the rotation parameter, of at least a portion of the reference image, via change, based on the scaling parameter, of at least one of a level of detail (LOD) and a size of the reference image, and via shearing, based on the shearing parameter, of at least a portion of the reference image;
determine motion information associated with a coding block of a current image, the current image and the reference image being temporally different; and
determine a motion vector based on a coordinate of the prediction block associated with the modified image object and a coordinate of the coding block of the current image, the coding block of the current image being associated with a zoomed image object matched with the modified image object,
wherein the motion information is associated with at least one of the modification parameter and the modified reference image, and
wherein the motion vector is further determined based on a scaling ratio associated with modification of the reference image.

5. The mobile terminal of claim 4, wherein:
the video coder is further configured to cause the mobile terminal to:
change at least one of a level of detail (LOD) of the reference image and a size of the reference image; and
determine a prediction block of the modified reference image;
the prediction block is associated with a modified image object in the modified reference image; and the modified image object comprises a change in at least one of the LOD and the size.

6. The mobile terminal of claim 4, wherein the video coder is further configured to cause the mobile terminal to:
extract the motion vector and information associated with the scaling ratio.

7. The mobile terminal of claim 4, wherein:
the video coder is further configured to cause the mobile terminal to:
rotate at least a portion of the reference image; and
determine a prediction block of the modified reference image;
the prediction block is associated with a modified image object in the modified reference image; and
the modified image object comprises a rotation of the at least a portion of the reference image.

8. The mobile terminal of claim 4, wherein the video coder is further configured to cause the mobile terminal to:
perform inter-image prediction for the coding block of the current image based on at least one of the motion information and the modified reference image.

9. The mobile terminal of claim 4, wherein the memory comprises at least one of a system memory included in an application processor of the system-on-chip and an external memory interfaced with a memory controller of the application processor.

10. An application processor (AP), comprising:
a processor;
a video coder; a memory configured to store a reference image; and
a graphic processing unit (GPU),
wherein at least one of the processor and the video coder is configured to cause the AP to:
determine a modification parameter to modify a reference image, the modification parameter comprising a scaling parameter, a rotation parameter, and a shearing parameter;
generate a modified reference image via rotation, based on the rotation parameter, of at least a portion of the reference image, via change, based on the scaling parameter, of at least one of a level of detail (LOD) and a size of the reference image, and via shearing, based on the shearing parameter, of at least a portion of the reference image;
modify, based on a modification parameter, the reference image to generate a modified reference image;
determine motion information associated with a coding block of a current image, the current image and the reference image being temporally different; and
determine a motion vector based on a coordinate of the prediction block associated with the modified image object and a coordinate of the coding block of the current image, the coding block of the current image being associated with a zoomed image object matched with the modified image object,
wherein the motion information is associated with at least one of the modification parameter and the modified reference image, and
wherein the motion vector is further determined based on a scaling ratio associated with modification of the reference image.

11. The AP of claim 10, wherein:
at least one of the processor and the video coder is further configured to cause the AP to:
change at least one of a level of detail (LOD) of the reference image and a size of the reference image; and
determine a prediction block of the modified reference image; and
the prediction block is associated with a modified image object in the modified reference image; and
the modified image object comprises a change in at least one of the LOD and the size.

12. The AP of claim 10, wherein at least one of the processor and the video coder is further configured to cause the AP to:
extract the motion vector and information associated with the scaling ratio.

13. The AP of claim 10, wherein:
at least one of the processor and the video coder is further configured to cause the AP to:
rotate at least a portion of the reference image; and
determine a prediction block of the modified reference image;
the prediction block is associated with a modified image object in the modified reference image; and
the modified image object comprises a rotation of the at least a portion of the reference image.

14. The AP of claim 10, wherein at least one of the processor and the video coder is further configured to cause the AP to:
perform inter-image prediction for the coding block of the current image based on at least one of the motion information and the modified reference image.

* * * * *